(12) United States Patent
Yachida

(10) Patent No.: US 11,100,691 B2
(45) Date of Patent: Aug. 24, 2021

(54) IMAGE PROCESSING SYSTEM, IMAGE PROCESSING METHOD AND PROGRAM, AND DEVICE

(71) Applicant: NEC Corporation, Tokyo (JP)

(72) Inventor: Shoji Yachida, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/297,475

(22) Filed: Mar. 8, 2019

(65) Prior Publication Data

US 2019/0206107 A1 Jul. 4, 2019

Related U.S. Application Data

(63) Continuation of application No. 14/673,929, filed on Mar. 31, 2015, now abandoned.

(30) Foreign Application Priority Data

Mar. 31, 2014 (JP) .................. 2014-070719

(51) Int. Cl.
| | | |
|---|---|---|
| *G06K 9/00* | (2006.01) | |
| *G08G 1/017* | (2006.01) | |
| *H04N 1/00* | (2006.01) | |
| *H04L 9/00* | (2006.01) | |
| *G06T 11/60* | (2006.01) | |
| *H04N 7/18* | (2006.01) | |

(52) U.S. Cl.
CPC .......... *G06T 11/60* (2013.01); *G06K 9/00288* (2013.01); *G06K 9/00369* (2013.01); *G06K 9/00664* (2013.01); *G08G 1/017* (2013.01); *H04N 1/00177* (2013.01); *H04N 7/181* (2013.01); *H04N 7/185* (2013.01); *G06K 9/00228* (2013.01); *G06K 2209/15* (2013.01); *H04L 9/00* (2013.01)

(58) Field of Classification Search
CPC ...... H04L 9/00; H04N 1/00177; G08G 1/017; G06K 9/00288; G06K 2209/15
See application file for complete search history.

(56) References Cited

U.S. PATENT DOCUMENTS

| | | | |
|---|---|---|---|
| 10,034,049 B1* | 7/2018 | Deephanphongs | .... H04H 60/45 |
| 2002/0175997 A1 | 11/2002 | Takata et al. | |

(Continued)

FOREIGN PATENT DOCUMENTS

| | | |
|---|---|---|
| JP | 2002-183180 A | 6/2002 |
| JP | 2003-46911 | 2/2003 |

(Continued)

OTHER PUBLICATIONS

International Search Report and Written Opinion dated Jun. 16, 2015 in corresponding PCT International Application No. PCT/JP2015/001591.

(Continued)

*Primary Examiner* — Matthew Salvucci

(57) ABSTRACT

The disclosed embodiments include computer-implemented devices, systems, and methods that support image processing services. In an embodiment, a server may match a partial image received from a terminal with stored candidate image in the memory, and upon identification of a match, transmit information identifying the matched candidate image to the terminal.

26 Claims, 21 Drawing Sheets

(56) References Cited

U.S. PATENT DOCUMENTS

| | | | |
|---|---|---|---|
| 2006/0193509 A1 | 8/2006 | Criminisi et al. |
| 2011/0096922 A1 | 4/2011 | Oya |
| 2012/0307091 A1 | 12/2012 | Yumiki et al. |
| 2013/0330011 A1 | 12/2013 | Sato |
| 2015/0012840 A1 | 1/2015 | Maldari et al. |
| 2015/0146922 A1 | 5/2015 | Kurokawa et al. |

FOREIGN PATENT DOCUMENTS

| | | |
|---|---|---|
| JP | 2004-128615 | 4/2004 |
| JP | 2004-280376 A | 10/2004 |
| JP | 2006-148842 | 6/2006 |
| JP | 2006-165763 A | 6/2006 |
| JP | 2007-158421 | 6/2007 |
| JP | 4104577 | 6/2008 |
| JP | 2011-114580 A | 6/2011 |
| JP | 2012-033054 A | 2/2012 |
| JP | 2013-258532 | 12/2013 |
| WO | WO 2013/145530 A1 | 10/2013 |
| WO | WO 2014/017398 A1 | 1/2014 |

OTHER PUBLICATIONS

Office Action dated Sep. 15, 2020, issued by the Japanese Patent Office in counterpart Japanese Patent Application No. 2019-183844.
Japanese Office Action for JP Application No. 2019-183844 dated Apr. 27, 2021 with English Translation.

* cited by examiner

IMAGE PROCESSING SYSTEM, IMAGE PROCESSING METHOD AND PROGRAM, AND DEVICE

CROSS-REFERENCE TO RELATED PATENT APPLICATIONS

This application is a continuation of U.S. patent application Ser. No. 14/673,929, filed Mar. 31, 2015, which claims priority from Japanese Patent Application No. 2014-070719, filed Mar. 31, 2014. The entire contents of the above-referenced applications are expressly incorporated herein by reference.

BACKGROUND

Technical Field

The present disclosure generally relates to an image processing technology.

Description of the Related Art

In recent years, surveillance cameras have been set up everywhere for a crime prevention effect and for checking the situation upon occurrence of a crime. However, as blind spots often occur with only fixed surveillance cameras. In some instances, a wearable surveillance camera system may supplement a fixed surveillance camera to improve visibility and reduce the occurrence of blind spots.

For example, in some systems, a direction and/or position of a wearable surveillance camera may be controlled flexibly according to wearer's movement. Further, in certain system, a surveillance camera may apply a high-compression encoding scheme to captured image data to reduce an amount of image data transmitted to a center server.

For example, surveillance cameras may apply an image compression scheme, such as the MPEG2 (Moving Picture Experts Group) scheme and the H.264 scheme, to captured image data, which may be collected via a wired network (e.g., an Ethernet) and/or a wireless network. Using some high-compression encoding schemes, however, the encoded image data may include compressive artifacts or the like, and it may be impossible to obtain clear image data required to support services.

SUMMARY OF THE INVENTION

To achieve such an object, one aspect of the present invention is a an image processing system including a terminal including: an image accumulation unit that stores an image and identification information on the image or a partial image of the image; a transmission unit that transmits the identification information and the partial image to a server; and an output unit that outputs additional information based on identification information received from the server, and a server including: an image matching unit that matches the partial image received from the terminal with an accumulated candidate image; and a transmission unit that transmits the identification information corresponding to the matched image to the terminal.

And, another aspect of the present invention is an image processing system including a terminal including: an image accumulation unit that stores an image and identification information on the image or a partial image of the image; and a transmission unit that transmits the identification information of the image and the partial image of the image to a server and transmits the image identified by identification information received from the server to the server, and a server including: an image matching unit that matches the partial image received from the terminal with an accumulated candidate image; and a transmission unit that transmits the identification information corresponding to the matched image to the terminal.

And, another aspect of the present invention is an image processing device including an output unit that outputs an image of an object region when a value indicating a size of the object region of an image taken by an imaging unit is greater than a threshold, and, otherwise, outputs an image of a predetermined region including the object region.

According to the present invention, an image processing system, an image processing method and program, and a device that can appropriately perform service support are provided.

DETAILED DESCRIPTION

In the following, exemplary embodiments are described using the drawings. Wherever possible, the same reference numbers will be used throughout the drawings to refer to the same or like parts.

Further, the following description makes reference to units constituting a device, apparatus, or the like. Consistent with the disclosed embodiments, and without limitation, one or more of the units may be realized by hardware, such as a logical circuit. In other instances, and without limitation, one or more of the units may be realized by a computer control unit, storage units such as a memory, a program including processor- and/or computer-implementable instructions loaded to the memory and a hard disk that stores the program, and an interface for network connection, and so on. In further aspects, and without limitation, one or more of the units may be realized by an arbitrary combination of hardware and software (e.g., processor- and/or computer-implementable instructions stored on a tangible, non-transitory computer-readable medium).

Additionally, in this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise.

Embodiment 1

Figure 1:
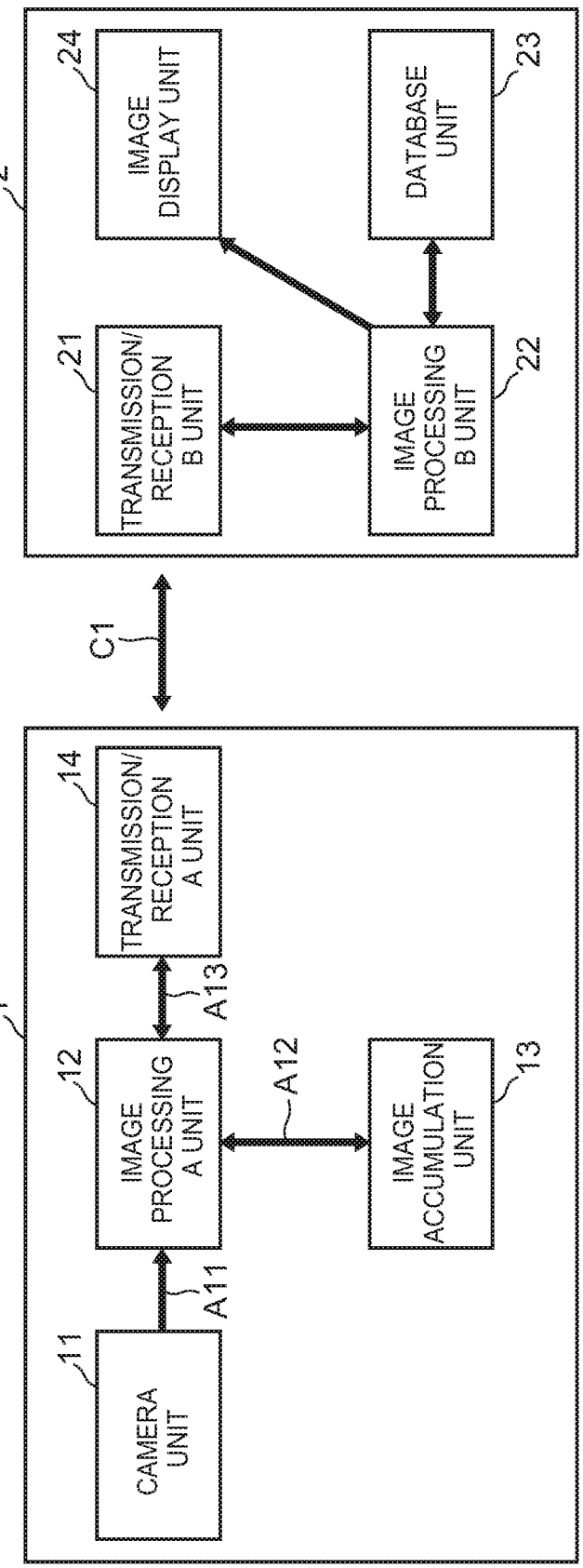
FIG. 1 illustrates an exemplary configuration of an image processing system, consistent with the disclosed embodiments.

FIG. 1 is a diagram illustrating one example of the whole image processing system configuration, in accordance with a first exemplary embodiment.

The image processing system includes a first surveillance information terminal unit 1 and a first surveillance server unit 2. The first surveillance information terminal unit 1 and the first surveillance server unit 2 may be connected with each other through a wired or wireless communication channel C1.

As illustrated in FIG. 1, the first surveillance information terminal unit 1 may include a camera unit 11, an image processing A unit 12, an image accumulation unit 13 and a transmission/reception unit 14.

In some aspects, the camera unit 11 captures image data A11 and inputs to the image processing A unit 12.

In an instance where an object is included in image data A11, the image processing A unit 12 may detect an object region including the object on the basis of a predetermined detection parameter. The predetermined detection parameter may be a size of region sufficient to detect a person's face, a size of detection window for detecting objects, and/or a parameter for SIFT (Scale-invariant feature transform) algorithm. In some aspects, the image processing A unit 12 may process image data A11 to extract or "cut out" an image of the object region. The cut-out image may, for example, may represent partial image data A13. The object detected by the image processing A unit 12 may include, for example, a person's face, a bag and a car, and so on.

The image processing A unit 12 may output the partial image data A13 and an image identifier (e.g., an image ID), such as a frame number input from the camera unit 11, to the transmission/reception unit 14.

In certain aspects, the image processing A unit 12 records image data A11 in the image accumulation unit 13 together with the image ID. By way of example, a combination of image data A11 and the image ID may represent at least a portion of recording data A12, and the image ID may be a frame number.

In some embodiments, image data A11 may identify a plurality of objects displayed within corresponding regions on a screen. In certain instances, the image ID may correspond to an identifier (e.g., an ID) assigned to or associated with each of the object regions. Additionally or alternatively, the image ID may correspond to positional information (e.g., coordinate information) of at least one of the objects, a size of at least one of the objects, and so on.

In an embodiment, and based on a relationship between a recording capacity and/or a recording time of the image accumulation unit 13, the image processing A unit 12 may perform image compression of recording data A12 using a dynamic image compression scheme for. The dynamic image compression scheme may include, for example, an encoding scheme using an inter-frame differences, including, but not limited to ISO/IEC 13818-2 (MPEG-2 encoding scheme) and ISO/IEC 14496-10 (MPEG-4 AVC scheme).

In some aspects, the image processing A unit 12 may receive a request for an image data from the first surveillance unit 2. In response to the received request, the image processing A unit 12 may transmit the requested image data to the first surveillance server unit 2 through the transmission/reception A unit 14, as described below.

In some aspects, the transmission/reception unit 14 may transmit partial image data A13 and the image ID, which are output from the image processing A unit 12, to the first surveillance server unit 2. The transmission/reception A unit 14 may additionally transmit the image data to the first surveillance server unit 2.

The first surveillance server unit 2 may include a transmission/reception B unit 21, an image processing B unit 22, a database unit 23 and an image display unit 24.

The transmission/reception B unit 21 may, for example, input partial image data A13 and the image ID from the first surveillance information terminal unit 1. In certain aspects, the image processing B unit 22 may obtain the partial image data A13 and/or the image ID from the transmission/reception B unit 21.

In some instances, the image processing B unit 22 matches at least a portion of the partial image data A13 against image data stored in the database unit 23. In an embodiment, the image processing B unit 22 may establish the image matching method in accordance with one or more characteristics of an object to be matched.

In an instance where the image processing unit 22 matches the partial image data A13 to an image data included in the database unit 23, the image processing B unit 22 requests image data from the first surveillance information terminal unit 1 through the transmission/reception B unit 21. In one aspect, the image processing B unit 22 may transmit an image ID corresponding to the matched image data stored in the database unit 23 to the first surveillance information terminal unit 1. In other aspects, image processing unit 22 may transmit the image ID corresponding to the matched image data stored in the database unit 23 in addition to the matched image data.

Further, when image data is recorded in the image accumulation unit 13 in a non-compressed manner or in an intra-frame compression scheme, the image processing B unit 22 may transmit corresponding frame image data to the first surveillance information terminal unit 1. In an instance where the image data is recorded in the image accumulation unit 13 in a dynamic image compression scheme, the image processing B unit 22 may transmit an image stream including frame image data, which may include the image ID, to the first surveillance information terminal unit 1. The intra-frame compression scheme may include, for example, ISO/IEC 10918-1 (JPEG compression scheme), and the image stream transmitted in the above-mentioned dynamic image compression scheme may include a GOP (Group of Picture) unit in the MPEG-2 encoding scheme.

In an embodiment, and using the matching processes outlined above, image processing B unit 22 may identify an object (i.e., a matched object) within the image data received by the first surveillance server unit 2 that matches a corresponding object within the image data stored in the database unit 23. Image processing B unit 22 may transmit the image ID corresponding to the matched image data stored in the database unit 23 for requesting an image data, to the first surveillance information terminal unit 1. The transmission/reception A unit 14 may transmit the image data corresponding to the received image ID to the first surveillance server unit 2.

The image processing B unit 22 may, in some aspects, superimpose information related to the matched object over the received image data, which may be presented to a user by the image display unit 24.

Figure 8:
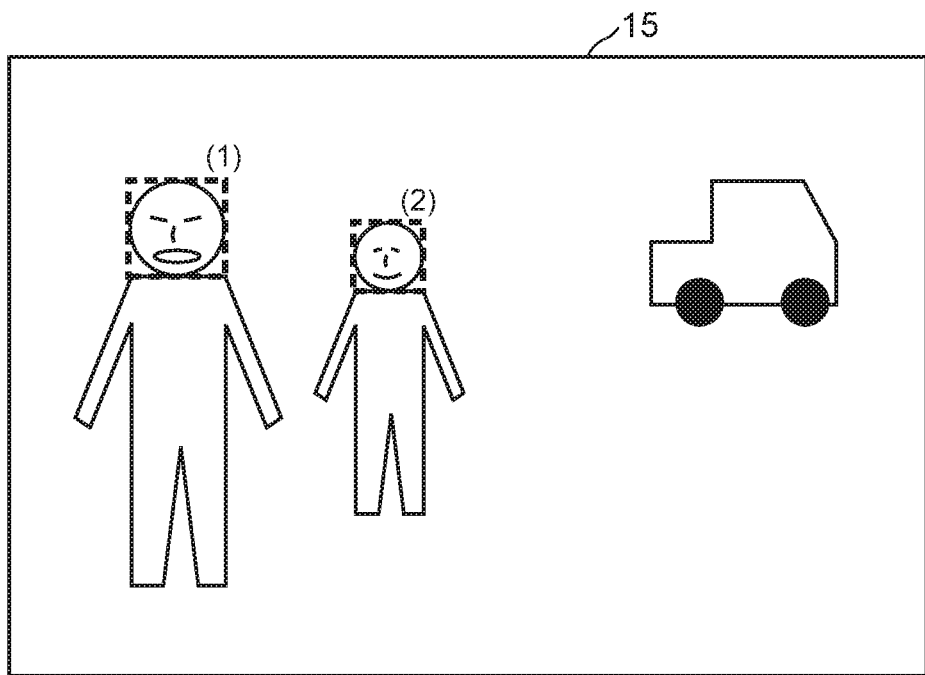
FIG. 8 illustrates an example of image display, consistent with the disclosed embodiments.

For example, if the matched object image includes a person's face, the image processing unit 22 performs superimposition display of a border on a position corresponding to a region that includes the matched face, as illustrated in FIG. 8. The disclosed embodiments are, however, not limited to processes that superimpose a border on a portion of the matched image, and in further embodiments, the image processing unit 22 may superimpose an image ID or the like a portion of the matched image, either alone or in addition to the border.

Figure 2:
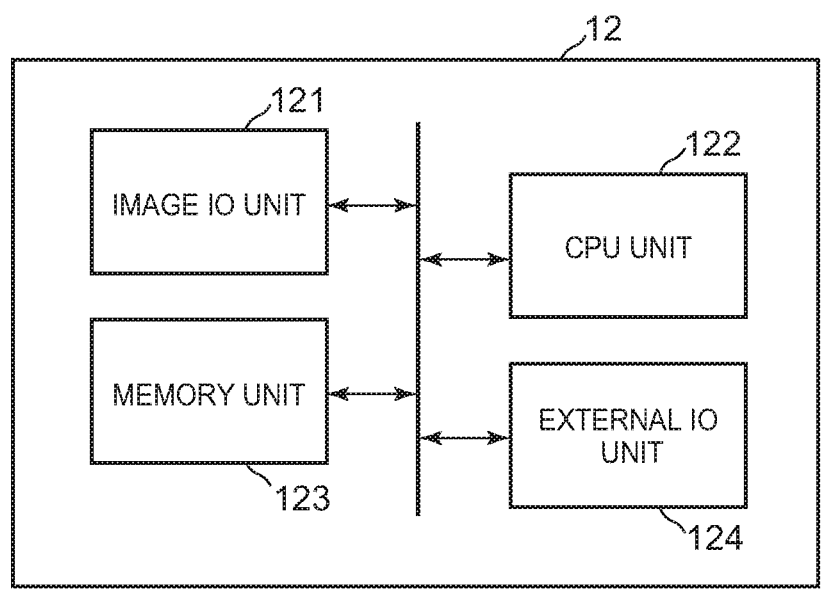
FIG. 2 illustrates an exemplary configuration of an image processing unit, consistent with the disclosed embodiments.
Figure 3:
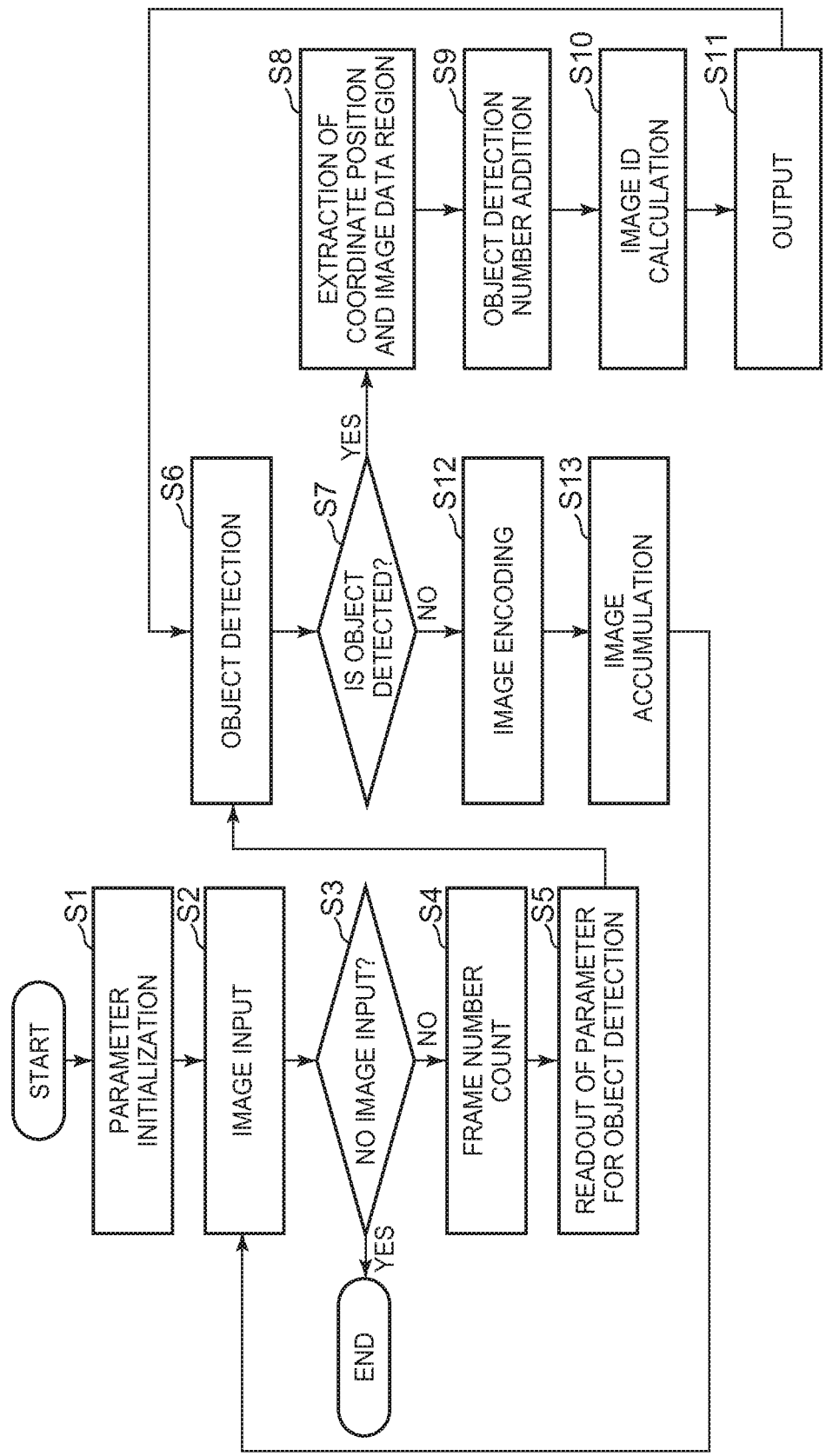
FIG. 3 depicts a flowchart of an exemplary process, consistent with the disclosed embodiments.
Figure 4:
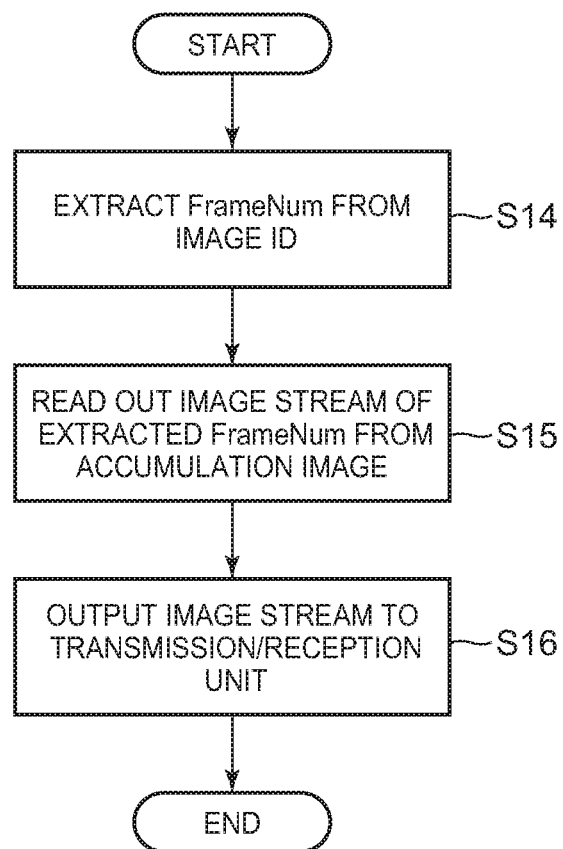
FIG. 4 depicts a flowchart of an exemplary process, consistent with the disclosed embodiments.

FIGS. 2, 3, and 4 illustrate an exemplary operation of the image processing unit 12, in accordance with disclosed embodiments. For example, as illustrated in FIG. 2, the image processing A unit 12 may include an image IO (Input/Output) unit 121, a CPU (Central Processing Unit) unit 122, a tangible, non-transitory memory unit 123, and an external IO unit 124. In some aspects, memory unit 123 may store instructions that, when executed by CPU unit 122, may cause CPU unit 122 to perform the exemplary processes illustrated in the flowcharts of FIG. 3 and FIG. 4.

By way of example, FIG. 3 illustrates an exemplary process performed by image processing unit 12 when operating in a normal surveillance state. In certain aspects, the CPU unit 122 may initializes each parameter at the time of power activation (e.g., in step S1) and may accept an input of an image from the camera unit 11 (e.g., in step S2).

In step S3, the CPU unit 122 may determine whether the image IO unit 121 failed to input image data to the CPU unit 122. When there is no image input from the image IO unit 121 (step S3; YES), the CPU unit 122 may finish processing, and the exemplary process may be complete. While, when there is an image input from the image IO unit 121 (step S3; NO), the CPU unit 122 counts the number of frames (e.g., a FrameNum) in step S4 and reads a parameter for object detection from the memory unit 123 in step S5. The CPU unit 122 may detect an object from input image data on the basis of the read parameter (e.g., in step S6).

In step S7, the CPU unit 122 determines whether the object has been detected within the input image data. In an instance where the CPU unit 122 detects the object (step S7; YES), the CPU unit 122 extracts coordinates position information (e.g., ObjectCoord) in the image of the detected object and image data region (e.g., ObjectXsize, ObjectYsize) that includes the detected object (e.g., in step S8). The CPU unit 122 may also assign a unique object detection number (e.g., an ObjectNum) to the detected object (e.g., in step S9).

In certain aspects, the CPU unit 122 may link the object detection number, the coordinate position information and the image data region (e.g., partial image data A13), and may store them by using a table. The CPU unit 122 may also calculate an image ID based on the object detection number and the frame count (e.g., in step S10). In some instances, in step S10, the CPU unit 122 may establish the frame count as the image ID for the purpose of processing reduction.

The CPU unit 122 may output the image ID and partial image data A13 to the transmission/reception A unit 14 (e.g., in step S11). In some aspects, the exemplary process may pass back to step S6, and the CPU unit 122 may detect an additional object within the image data, as described above. The transmission/reception A unit 14 may, in step S11, transmit the image ID and partial image data A13 to the first surveillance server unit 2.

In some embodiments, the CPU unit 122 may repeat the detection operation in the whole image data region. When the CPU unit 122 detects no additional objects (e.g., step S7; NO), the image data detection operation is complete. The CPU unit 122 may perform image encoding with the image ID attached in the frame (e.g., in step S12) and may record image data in the image accumulation unit 13 by the external IO unit 124 (e.g., in step S13).

As illustrated in FIG. 4, in an instance where there is a request of the image ID and image data from the first surveillance server unit 2, the CPU unit 122 analyzes the image ID and extracts the frame number (e.g., in step S14). The CPU unit 122 may read accumulated image data including image data of the frame number from the image accumulation unit 13 (e.g., in step S15), and may output the accumulated image data to the transmission/reception unit 14 (e.g., in step S16). In some aspects, the transmission/reception unit 14 may transmit image data to the first surveillance server unit 2.

By these operations, the image processing system can maintain an image quality required for performing image matching, while reducing a size of image data transmitted and received between the first surveillance information terminal unit 1 and the first surveillance server unit 2. After the image matching, a surveillance agent of the first surveillance server unit 2 may supervise the whole image of the matching result.

Figure 16:
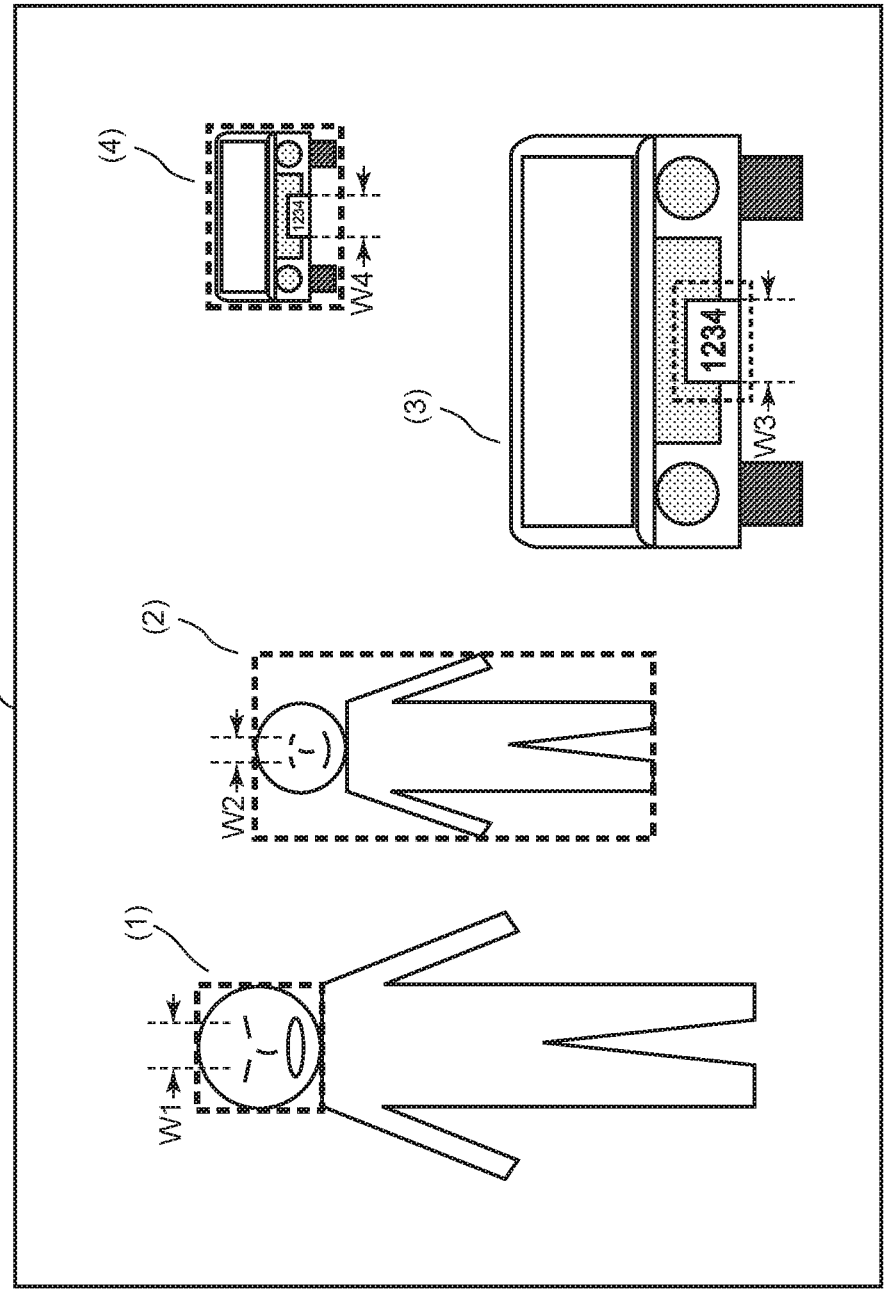
FIG. 16 depicts a flowchart of an exemplary image cutout method, consistent with the disclosed embodiments.

Next, object detection operation in the image processing A unit 12 in FIG. 1 is described in detail using FIG. 16. For example, in an instance where the image processing system supervises a person as a surveillance target, and if the surveillance target were a wanted person, the image processing system may be configured to perform face matching with the wanted person's photographs. Thus, in some aspects, the size of a detected face image may correspond to a size required for matching with the wanted person's photographs. In other aspects, the size of a detected face image may exceed a predetermined threshold value.

For example, as illustrated in FIG. 16, in an instance where an inter-eye distance W1 of a first person's face is greater than predefined pixel number TH1 and less than TH2, the image processing A unit 12 cuts out an image data region (1) of a size larger than a region outlining the first person's face. In this case, there is a high possibility that the size of the face image is sufficient to facilitate face matching using any of the exemplary processes described above.

In other aspects, illustrated in FIG. 16, in an instance where inter-eye distance W2 of a second person's face is less than predefined pixel number TH1, the image processing A unit 12 cuts out an image data region (2) of a size larger than a region outlined by an entire body of the second person. Since there is a high possibility that the size of the second person's face image is not larger than a predetermined threshold, face matching is performed by using an image of the entire target.

In some embodiments, although the size of the first person's face may be greater than predefined pixel number TH1 and less than TH2, a possibility exists that the image processing unit 12 may be unable to acquire the first person's facial features (e.g., because the first person wears glasses or a mask). In certain aspects, the image processing A unit 12 may cut out an image data region larger in size than the region (1) outlined by the first person's face (e.g., a region outlining the entire body of the first person).

As another example, the target object for surveillance within the image data (e.g., a surveillance object) may correspond to a wanted vehicle. In an instance where the surveillance object is assumed to be a wanted vehicle, the image processing unit 12 may determine whether a license plate is detectable or not, and further, whether the license plate is readable or not. For example, when the image processing A unit 12 determines that a width W3 of the detected license plate is greater than predefined pixel number TH1 and less than a predefined pixel number TH2, a high possibility exists that the license plate is readable by the image processing unit 12, and the image processing A unit 12 may cut out a region corresponding to the license plate as an image data region (3).

Alternatively, in an instance where the image processing unit 12 determines that a width W4 of a license plate is less than predefined pixel number TH1, the image processing A unit 12 cuts out an image data region (4) of a larger size than the outline of the entire car and sends the image data region (4) to a surveillance server.

In certain aspects, and using the exemplary image cutouts described above, the image processing unit 12 may reduce a transmission data size by not transmitting a useless image region to the first surveillance server unit 2.

According to the disclosed exemplary embodiments, the image processing system may maintain an image quality required for performing image matching, while reducing the data size transmitted and received between the first surveillance information terminal unit 1 and the first surveillance server unit 2. Further, after the image matching, a surveillance agent of the first surveillance server unit 2 may monitor the whole image corresponding to the matching result. Therefore, in certain aspects, the image processing system may appropriately perform service support.

In some embodiments, the image processing system, and its components, may perform the exemplary processes described above to provide surveillance services. The disclosed embodiments are, however, not limited to surveillance services, and in other embodiments, the image processing system may perform on the more of the processes described above to provide customer services, maintenance inspection services, and other similar services.

In some aspects, the surveillance information terminal unit and the surveillance server unit may be referred to a terminal and a server, respectively. The terminal may, for instance, be associated with a surveillance agent, a serving person, and so on. In certain aspects, the terminal may include a mobile or handheld computing device (e.g., carried by a hand or other instrument of the person), and additionally or alternatively, a computing device integrated into a person's clothing or garments (e.g., a wearable computing device or a computing device in communication either a smart textile or electronic fabric).

In further aspects, the terminal may correspond to a "scouter." The scouter may include a wearable computer that combines an eye line camera and an optical head-mounted display (e.g., a glasses-type head mount display) that presents a half-transparent image on part or entire of a person's field-of-view. For example, the scouter may be provided with a computing device configured to perform one or more of the data transmitting and output processes described above. When the scouter includes a dedicated glass frame with a camera or audio apparatus (e.g., a microphone and earphones), the scouter can support not only the surveillance service, but also on-site services such as a maintenance inspection service and an assembly service, using any of the disclosed exemplary embodiments and processes.

Embodiment 2

Figure 5:
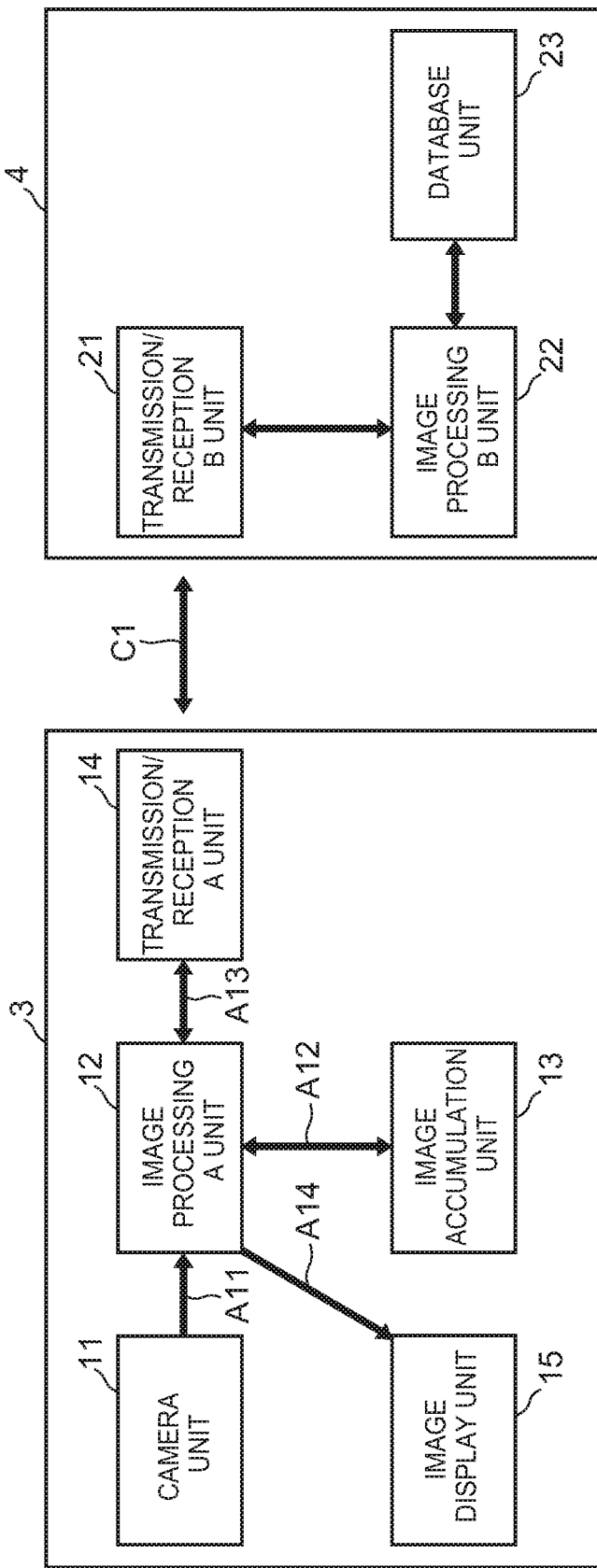
FIG. 5 illustrates an exemplary configuration of an image processing system, consistent with the disclosed embodiments.

FIG. 5 is a diagram of a whole image processing system configuration, in accordance with a second exemplary embodiment. The image processing system of FIG. 5 may include a second surveillance information terminal unit 3 and a second surveillance server unit 4. Additionally, the image processing system may include the first surveillance server unit 2, as described above.

The second surveillance information terminal unit 3 and the second surveillance server unit 4 (and additionally or alternatively, the first surveillance server unit 2) may communicate across wired or wireless communication channel C1. As described below in reference to FIG. 5, the second surveillance information terminal unit 3 and the second surveillance server unit 4 may be connected with each other through the communication channel C1.

In an embodiment, the second surveillance information terminal unit 3 includes a camera unit 11, an image processing A unit 12, an image accumulation unit 13, a transmission/reception A unit 14 and an image display unit 15. In certain aspects, the camera unit 11, image processing A unit 12, image accumulation unit 13, and transmission/reception A unit 14 of FIG. 5 are similar in functionality to corresponding elements of the first surveillance information terminal unit 1 described above in reference to FIG. 1.

For example, and as described above, camera unit 11 may capture image data A11, and may provide the image data A11 as input to the image processing A unit 12. Using any of the exemplary processes outlined above, the image processing A unit 12 may extract or "cut out" an object detected from image data A11 on the basis of a predetermined detection parameter. The image processing A unit 12 may establish an image ID for the image data A11 (e.g., based on the frame number input from the camera unit 11), and may transmit the image ID and partial image data A13 (e.g., which includes image data corresponding to the cut-out object) to the transmission/reception A unit 14 using any of the exemplary processes outlined above.

In some aspects, and as described above, an image ID consistent with the disclosed embodiments may identify a plurality of objects displayed within corresponding regions on a screen. In some instances, the image ID may correspond to an identifier (e.g., an ID) assigned to or associated with each of the object regions. Additionally or alternatively, the image ID may correspond to positional information (e.g., coordinate information) of at least one of the objects, a size of at least one of the objects.

The image processing A unit 12 may, in certain aspects, record image data A11 and the image ID in the image accumulation unit 13 using any of the exemplary processes outlined above.

The transmission/reception A unit 14 transmits partial image data A13 and the image ID, which are output from the image processing A unit 12, to the second surveillance server unit 4.

In an embodiment, the second surveillance server unit 4 may include a transmission/reception B unit 21, an image processing B unit 22, and a database unit 23. In some instances, the transmission/reception B unit 21, image processing B unit 22, and database unit 23 of FIG. 5 are similar in functionality to corresponding elements of the first surveillance server unit 2 described above in reference to FIG. 1.

As described above, the transmission/reception B unit 21 may input partial image data A13 and the image ID to the image processing B unit 22. Further, in certain aspects, the image processing B unit 22 may perform matching operation between partial image data A13 and image data stored in the database unit 23 using any of the exemplary processes outlined above.

For example, and as described above, if partial image data A13 matches an image stored within the database unit 23, the image processing B unit 22 may transmit the image ID corresponding to the matched image to the second surveillance information terminal unit 3 through the transmission/reception B unit 21.

Further, the image processing A unit 12 of the second surveillance information terminal unit 3 may read out from the image accumulation unit 13 image data A14 corresponding to the image ID obtained from the second surveillance information terminal unit 3. The image processing A unit 12 may superimpose information related to the matching result of the object image over the image data A14. The image processing A unit 12 may display the image data A14, which is superimposed by the information on the matching result of the object image on the display unit 15, as described below in reference to FIG. 6.

Figure 6:
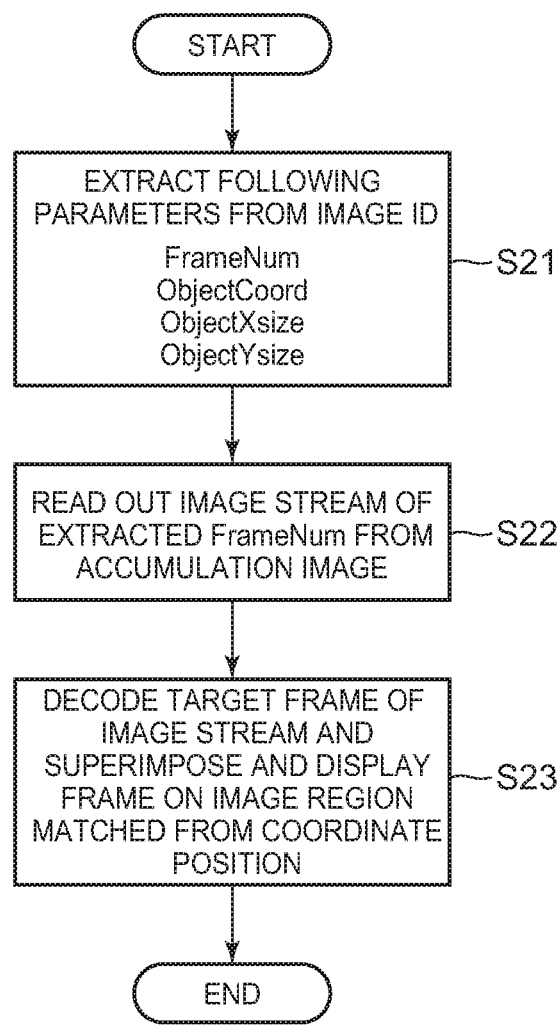
FIG. 6 depicts a flowchart of an exemplary process, consistent with the disclosed embodiments.

FIG. 6 illustrates an exemplary process for superimposing information of matching image data, consistent with the disclosed exemplary embodiments. In some aspects, the image processing A unit 12 may determine the frame number, coordinate position information, and image data region based on the image ID obtained from the second surveillance information terminal unit 3 (e.g., step S21 of FIG. 6). The image processing A unit 12 may access the image accumulation unit 13 and reads an image stream of the frame number (step S22 in FIG. 6). In certain aspects, the image processing A unit 12 may decode a target frame of the read image stream, and may superimpose information related to the matching result of the object image over an image of the decoded frame on a region indicated by the coordinate position information (e.g., step S23 in FIG. 6). An example of the superimposition display is similar to Embodiment 1.

In some aspects, the image processing system described herein may can secure images having a quality sufficient to perform image matching, while reducing a the size and/or amount of the image data transmitted and received between the second surveillance information terminal unit 3 and the second surveillance server unit 4. Further, since a surveillance agent may confirm a matching result image in the surveillance information terminal unit 3 in an instance when the second surveillance server unit 4 performs image matching, the image processing system may facilitate the surveillance agent's careful survey of the matching result object.

Further, in some aspects, the second surveillance information terminal unit 3 of FIG. 5 may be coupled to the first surveillance server unit 2 of FIG. 1 across communication channel C1. In certain aspects, the surveillance agent may use the first surveillance server unit 2 (e.g., a server) to perform surveillance using any of the exemplary processes outlined above. Thus, the disclosed exemplary embodiments may enable image processing system to perform appropriate service support.

Embodiment 3

Figure 7:
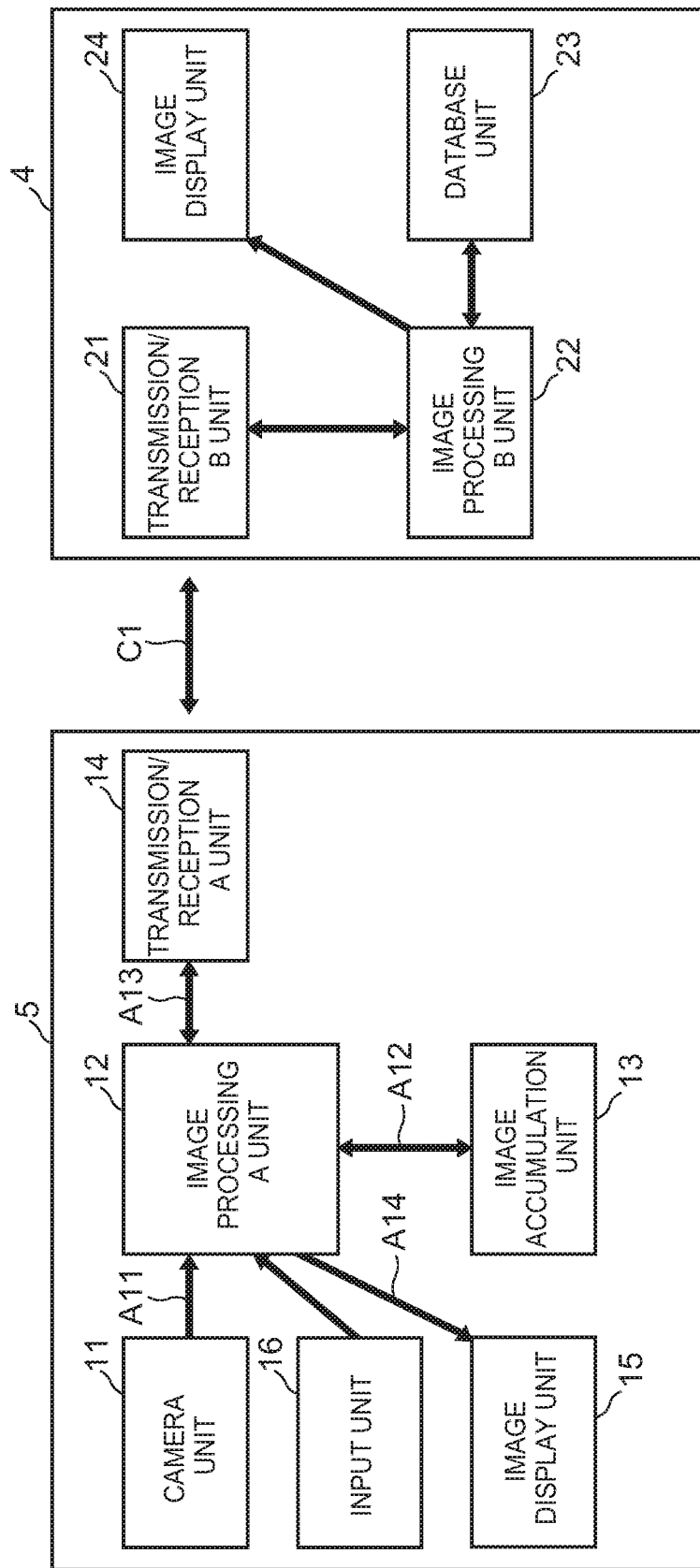
FIG. 7 illustrates an exemplary configuration of an image processing system consistent with the disclosed embodiments.

FIG. 7 illustrates a configuration of an exemplary image processing system, in accordance with a third embodiment. The image processing system of FIG. 7 includes a third surveillance information terminal unit 5 and the second surveillance server unit 4.

As described below in reference to FIG. 7, the third surveillance information terminal unit 5 and the second surveillance server unit 4 may be connected with each other through wired or wireless communication channel C1. Further, although not depicted in FIG. 7, the exemplary image processing system may also couple a first surveillance server unit 2 (e.g., as described above in reference to FIG. 5) to the third surveillance information terminal unit 5 across communications channel C1, either alone or in conjunction with the second surveillance server unit 4.

As illustrated in FIG. 7, the third surveillance information terminal unit 5 may include a camera unit 11, an image processing A unit 12, an image accumulation unit 13, a transmission/reception unit 14, an image display unit 15, and an input unit 16. In certain aspects, the camera unit 11, image processing A unit 12, image accumulation unit 13, and transmission/reception A unit 14, and the image display unit 15 of FIG. 7 are similar in functionality to corresponding elements of the first surveillance information terminal units 1 and 3 described above in reference to FIGS. 1 and 3.

As described above, the camera unit 11 may be configured to capture image data A11, to provide the captured image data 11 as an input to the image processing A unit 12. In certain aspects, the image processing A unit 12 may be configured to extract or "cut out" an object detected within image data A11 on the basis of a preset detection parameter using any of the exemplary processes described above. The transmission/reception A unit 14 may transmit the image ID and cut-out object image data A13 to the second surveillance server unit 4.

In some aspects, the image processing A unit 12 may be configured to store image data A11 in the image accumulation unit 13 together with the image ID. Further, using any of the exemplary processes described above, the image processing A unit 12 may superimpose the detected object over an image captured by camera unit 11 to generate a camera input image, and the image display unit 15 may present the camera input image having superimposed object to a user. By way of example, the image processing A unit 12 may superimpose a border on a detected face region, and the image display unit 15 may present an image that includes the detected face region and the superimposed border, as depicted in FIG. 8. As illustrated in FIG. 8, the ID to identify the person may be superimposed and displayed near the border of the face region. In some instances, the unique numbers (e.g., regions (1), and (2) in FIG. 8) may be superimposed and displayed near the border of the face region.

In an embodiment, the input unit 16 may include an information input unit installed as, for example, a touch sensor on a display screen, a cursor key, or a button that allows to directly input the ID of the person into the third surveillance information terminal unit 5.

In an embodiment, an object in a captured image may represent a person. By way of example, when a person who is doing a suspicious action appears in an image, a surveillance agent who is associated with the third surveillance information terminal unit 5 provide, to the input unit 16, information indicating an object region such as the person's ID. In certain instance, the surveillance agent may tap the region on the screen which is included in the person, and/or may input the unique number corresponding to the person. Further, in some instances, the image display unit 15 may present an image in which a border indicating the person's ID is superimposed on the person's face region (e.g., as illustrated in FIG. 8). The surveillance agent may select the presented border by tapping the region corresponding to the presented border, and the input unit 16 may input the person's ID which the selected border indicates.

When the ID is input (e.g., via the input unit 16), the third surveillance information terminal unit 5 may transmit the ID to the second surveillance server unit 4 such that the ID can be distinguished from other IDs. In certain instance, the input ID may be distinguished by a flag that the third surveillance information terminal unit 5 may add to the input ID. The second surveillance server unit 4 matches whether a face image of a person identified by the transmitted ID corresponds to a face image stored in the database unit 23. In a case where the face image of the person identified by the ID is a face image that is not stored, the face image of the person may be additionally stored in the database unit 23 as a person requiring special attention. By way of example, FIG. 3 illustrates an exemplary process performed by image processing unit 12 when operating in a normal surveillance state. In certain aspects, the CPU unit 122 may initializes each parameter at the time of power activation (e.g., in step S1) and may accept an input of an image from the camera unit 11 (e.g., in step S2).

Figure 9:
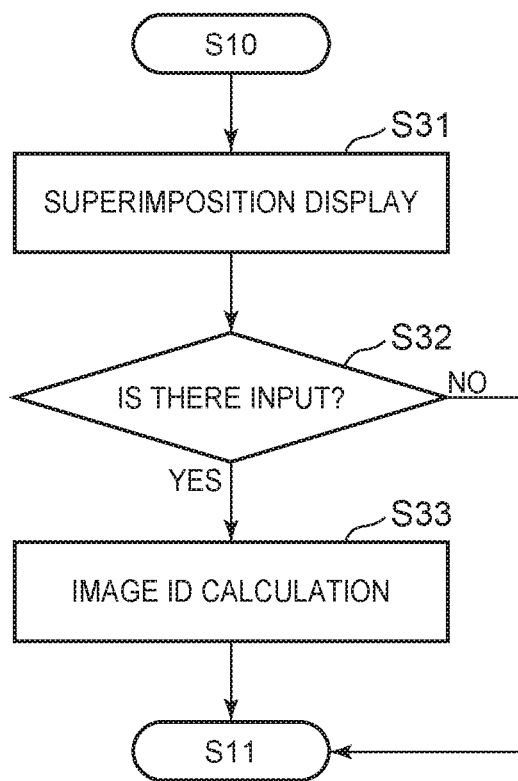
FIG. 9 depicts a flowchart of an exemplary process, consistent with the disclosed embodiments.

FIG. 9 illustrates an exemplary process performed by the image processing A unit 12 of the third surveillance information terminal unit 5. In certain aspects, as described above in reference to the exemplary configuration of FIG. 2, image processing A unit 12 may include an image IO unit 121, a CPU unit 122, a tangible, non-transitory memory unit 123, and an external IO unit 124. By way of example, the CPU unit 122 may be configured to perform the exemplary processes of FIG. 9 to determine an image ID associated with an input image data received through image I/O unit 121 (e.g., as captured by camera unit 11), and to assign the determined image ID to the input image data (e.g., step S10 of FIG. 3).

Referring to FIG. 9, The CPU unit 122 may be further configured to superimpose a detected object on an input image and to present the input image having the superimposed object on the image display unit 15 (e.g., step S31 of FIG. 9). In an instance where a noted object (e.g., an object watched by a surveillance agent, such as a wanted criminal) exists in an image, an operator of the third surveillance information terminal unit 5 may input or select an ID of the object using the input unit 16. The CPU unit 122 may determine whether the input unit 16 receives an input or selection of the ID from the operator (e.g., step S32 of FIG. 9).

If the CPU unite were to determine that the input unit 16 receive the operator's input or selection of the ID (e.g., step S32; YES), the CPU unit 122 may attach a noted object flag which indicates that the object is indicated by an input from the input unit 16 to the input ID or the selected ID and calculates the image ID (e.g., step S33 of FIG. 9). The exemplary processes of FIG. 9 are complete, and the CPU unit 122 may output the calculated image ID, as described above in reference to step S11 of FIG. 3. If, however, the CPU unit 122 were to determine that the operated provided neither input nor selection to the input unit 16, the exemplary process passes back to FIG. 3, and the CPU unit 122 calculated the image ID as described above (e.g., in step S10 of FIG. 3).

The second surveillance server unit 4 may match whether an image of an object identified by the image ID is an image stored in the database unit 23. In a case where the face image of the person identified by the ID is an image that is not stored, the face image of the person may be additionally stored in the database unit 23 as a target requiring special attention.

Using the exemplary embodiments described above, the third surveillance information terminal unit 5 can acquire a matching result by selecting a target to be surveyed. For example, when the third surveillance information terminal unit 5 is connected with the first surveillance server unit 2, a surveillance agent who performs surveillance on the server can perform surveillance. Thus, in some embodiments, the image processing system can appropriately perform service support.

Embodiment 4

Figure 10:
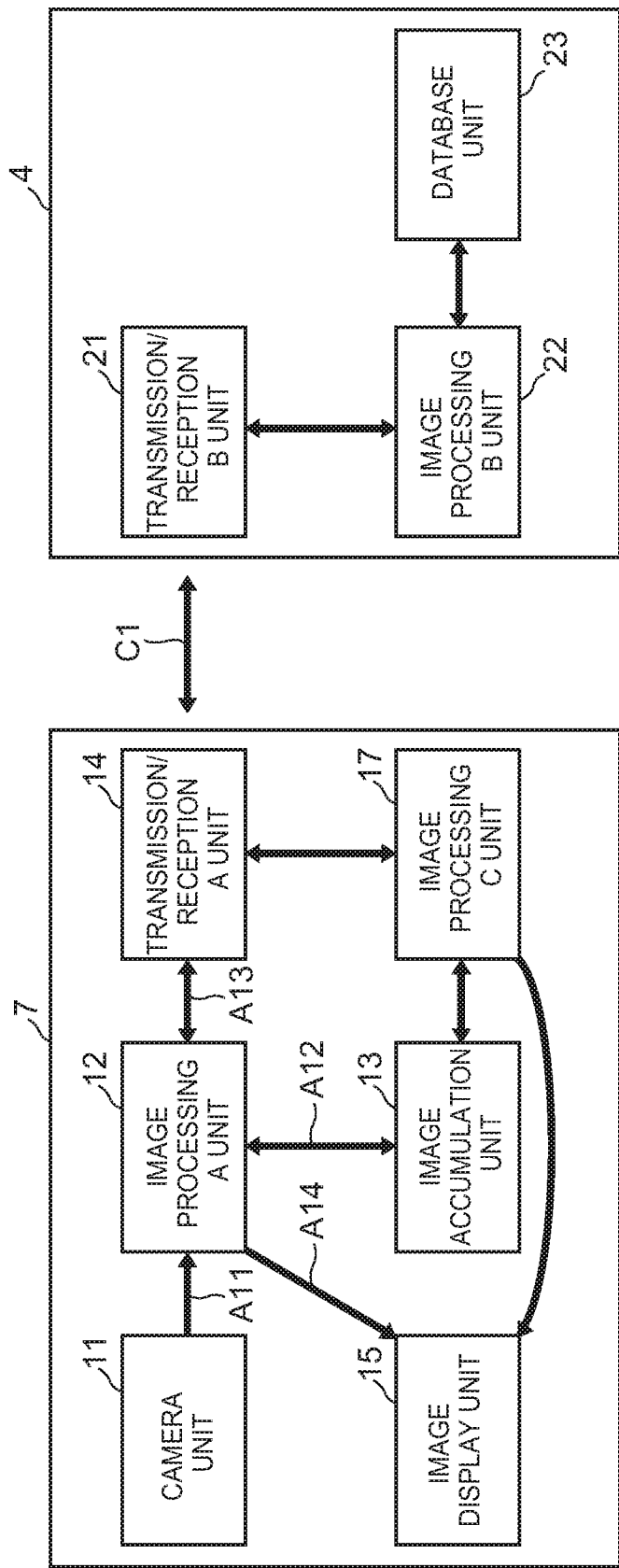
FIG. 10 illustrates an exemplary configuration of an image processing system, consistent with the disclosed embodiments.

FIG. 10 illustrates an exemplary configuration of an image processing system, in accordance with a fourth embodiment. The image processing system of FIG. 10 includes a fourth surveillance information terminal unit 7 and the second surveillance server unit 4 connected with each other through wired or wireless communication channel C1. Further, although not depicted in FIG. 10, the exemplary image processing system may also couple a first surveillance server unit 2 (e.g., as described above in reference to FIG. 1) to the fourth surveillance information terminal unit 7 across communications channel C1, either alone or in conjunction with the second surveillance server unit 4.

The fourth surveillance information terminal unit 7 may include a camera unit 11, an image processing A unit 12, an image accumulation unit 13, a transmission/reception unit 14, an image display unit 15 and an image processing C unit 17. In certain aspects, the camera unit 11, image processing A unit 12, image accumulation unit 13, transmission/reception A unit 14, and the image display unit 15 of FIG. 10 are similar in functionality to corresponding elements of the surveillance information terminal units 1, 3, and 5 described above in reference to FIGS. 1, 3, and 7.

In some instances, an object for surveillance within a corresponding surveillance region may be identified beforehand, and the second surveillance server unit 4 may be configured to transmit image data or image feature for identifying the image that includes the identified object to the fourth surveillance information terminal unit 7. In some instances, the image feature may include interest points, region of interest, edges, corners, blobs, ridges, and the like. The identified object may include, but is not limited to, a wanted criminal, a lethal weapon, loyal customer, etc. In some aspects, the identified object may represent a target object, and the target object may designated by a surveillance agent or similar individual stored in the database unit 23.

In certain aspects, the fourth surveillance information terminal unit 7 may receive the image data that includes the target object and/or the image feature from the second surveillance server unit 4, and may store (or temporarily store) the image data and the image feature in the image processing C unit 17.

The image processing C unit 17 may be configured to perform image using object image region data detected by the image processing A unit 12 in conjunction with the stored image data or the stored image feature. In an instance where the image processing C unit 17 identifies an image of the target object as a result of the image matching processes, the image of the target object or information to distinguish the image from other objects is presented on the image display unit 15.

In certain aspects, as described above in reference to the exemplary configuration of FIG. 2, the image processing C unit 17 may include an image IO unit 121, a CPU unit 122, a tangible, non-transitory memory unit 123, and an external IO unit 124. Therefore, if the resources of the CPU unit 122 in FIG. 2 are available, the image processing A unit 12 and the image processing C unit 17 may be configured to perform any of the exemplary processes described above using the same CPU unit (e.g., the CPU unit 122).

The exemplary image processing system of FIG. 10 may, in some instances, enable a surveillance agent or similar individual to perform surveillance of an object requiring special attention. Thus, the image processing system can perform and support appropriate services.

Embodiment 5

Figure 11:
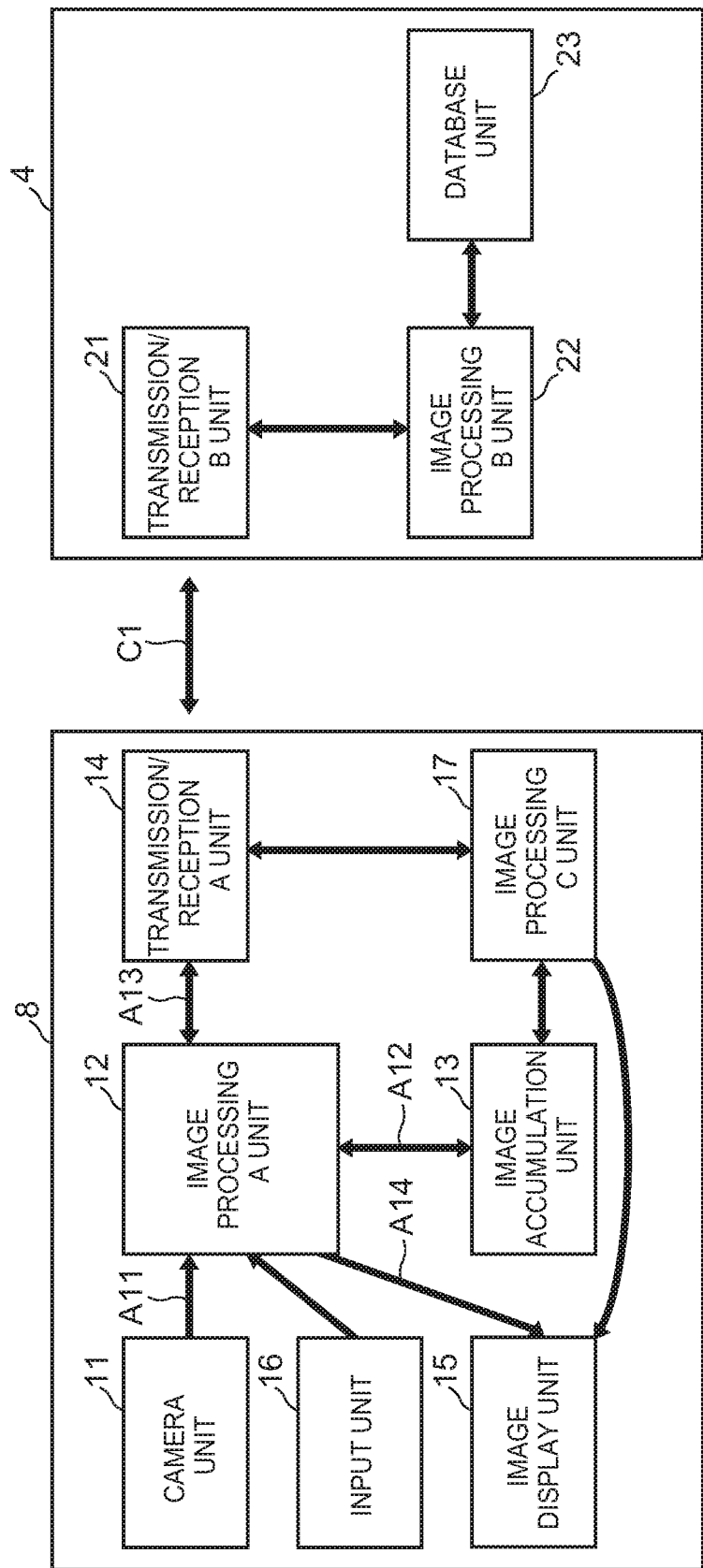
FIG. 11 illustrates an exemplary configuration of an image processing system, consistent with the disclosed embodiments.

FIG. 11 illustrates an exemplary configuration of an image processing system, in accordance with a fifth embodiment. The image processing system of FIG. 11 includes a fifth surveillance information terminal unit 8 and a second surveillance server unit 4 connected with each other through wired or wireless communication channel C1. Further, although not depicted in FIG. 10, the exemplary image processing system may also couple a first surveillance server unit 2 (e.g., as described above in reference to FIG. 1) to the fifth surveillance information terminal unit 8 across communications channel C1, either alone or in conjunction with the second surveillance server unit 4.

Referring to FIG. 11, the fifth surveillance information terminal unit 8 includes a camera unit 11, an image processing A unit 12, an image accumulation unit 13, a transmission/reception unit 14, an image display unit 15, an input unit 16 and an image processing C unit 17. In certain aspects, the camera unit 11, image processing A unit 12, image accumulation unit 13, transmission/reception A unit 14, image display unit 15, input unit 16, and image processing C unit 17 of FIG. 1 are similar in functionality to corresponding elements of the surveillance information terminal units 1, 3, 5, and 7 described above in reference to FIGS. 1, 3, 7, and 10.

In some aspects, the input unit 16 may include, but is not limited to, a touch sensor, a cursor key, or a button that allows an operator to directly input the ID, as described above. In an instance where a person performing a suspicious action appears in an image, a surveillance agent who is associated with the fifth surveillance information terminal unit 8 may receive the person's ID as an input from the input unit 16. The fifth surveillance information terminal unit 8 may, for example, transmit the ID to the second surveillance server unit 4 such that the ID can be distinguished from other IDs. In certain instance, the input ID may be distinguished by a flag that the fifth surveillance information terminal unit 8 may add to the input ID.

Further, in some instances, the second surveillance server unit 4 matches whether a face image of a person identified by the transmitted ID is a face image stored in the database unit 23. In an instance where the face image is not stored, the face image of the person may be additionally stored in the database unit 23 as a person requiring special attention.

In an instance where a target object is found beforehand, the second surveillance server unit 4 may transmit image data or image feature for identifying the image to the fifth surveillance information terminal unit 8. In certain aspects, the second surveillance server unit 4 may transmit the image data or the image feature to the fifth surveillance information terminal unit 8 upon detection of the target object or at a time proximate to the detection of the target object. Further, upon receipt of the image feature, the fifth surveillance information terminal unit 8 may store (e.g., permanently or temporarily) the received information in the image processing C unit 17.

The image processing C unit 17 may, in some aspects, perform image matching on the basis of object image region data detected in the image processing A unit 12 and the stored image data or the stored image feature. In an instance where the image of the target object is a result of the image matching process, the target object image and/or information to distinguish the target object image from other objects may be presented on the image display unit 15.

In the exemplary embodiments described above, the image processing system includes both the input unit 16 and the image processing C unit 17, the image processing system may thus designate a noted target on both the terminal and the server. Using the disclosed exemplary embodiments, a surveillance agent or similar individual may perform surveillance of a noted object more carefully, and the image processing system may perform and support appropriate services.

Embodiment 6

Figure 12:
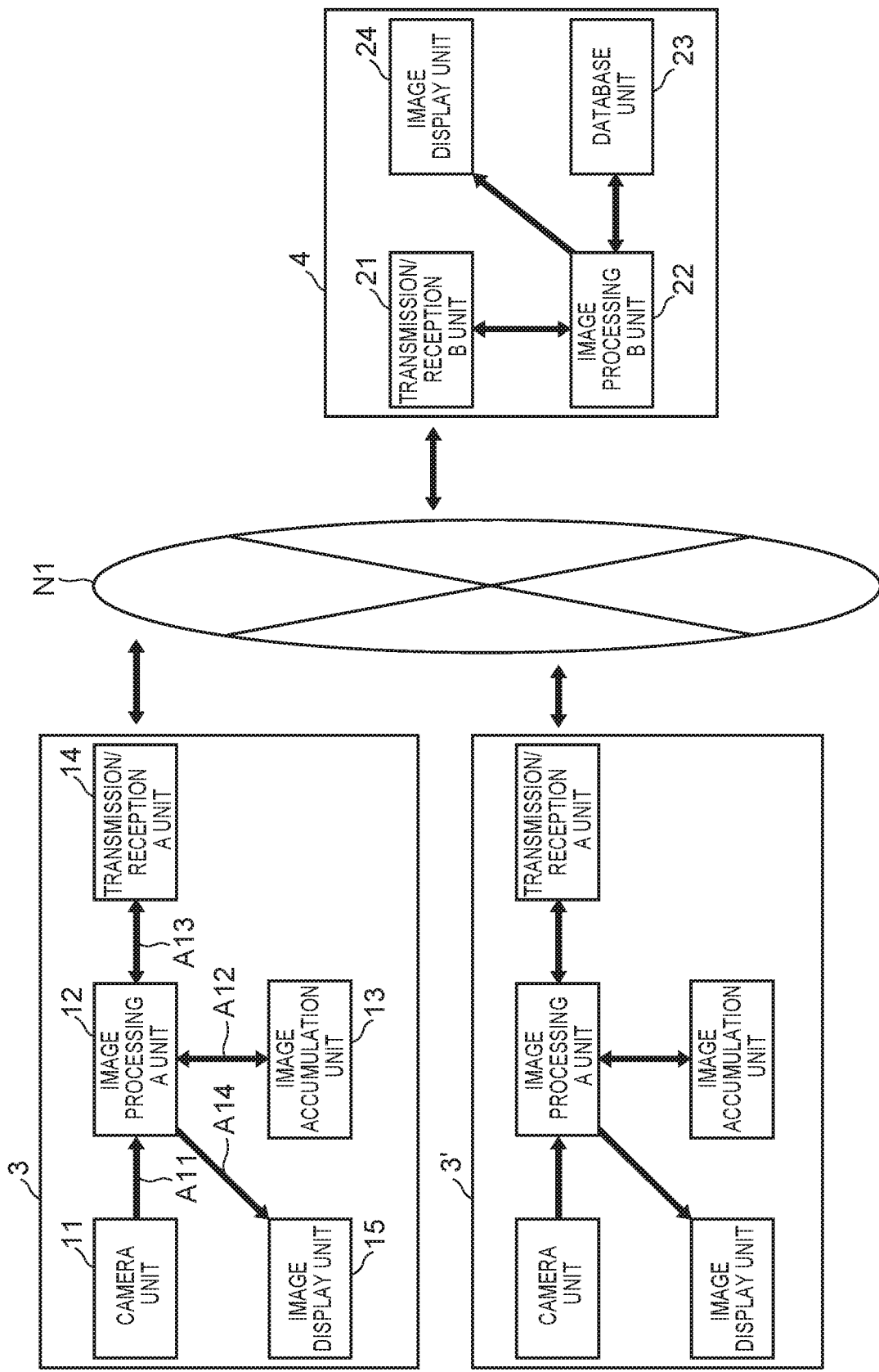
FIG. 12 illustrates an exemplary configuration of an image processing system, consistent with the disclosed embodiments.

FIG. 12 illustrates an exemplary configuration of an image processing system, in accordance with a sixth embodiment. The image processing system includes multiple second surveillance information terminal units (e.g., units 3 and 3') connected to a first surveillance server unit 2. Further, although described in terms of two second surveillance information terminal units 3 and 3', the disclosed embodiments are not limited to such exemplary numbers of terminal units, and in further embodiments, the image processing system may include any additional or alternate number of second surveillance information terminal units (e.g., three or more).

As illustrated in FIG. 12, the second surveillance information terminal units 3 and 3' and the first surveillance server unit 2 (or the second surveillance server unit 4) are connected with each other through wire or wireless communication channel C1. Since the configuration and operation of the second surveillance information terminal units 3 and 3' are described in above in reference to FIG. 5, only the different operation parts are described in detail.

In an embodiment, partial image data A13 of an object detected in the second surveillance information terminal unit 3 may be input in the first surveillance server unit 2 through the network N1. In the first surveillance server unit 2, the image processing B unit 22 may be configured to perform image matching between the image data or the image feature stored within the database unit 23 and partial image data A13. In a case where the partial image data A13 is matched with the stored image data, the first surveillance server unit 2 may be configured to transmit the stored image data (e.g., as stored within the database unit 23) to the second surveillance information terminal unit 3' as matching image data.

The second surveillance information terminal unit 3' may be configured to present the matching image data on the image display unit 15. In some aspects, the exemplary processes described above may facilitate sharing of image data detected by another surveillance information terminal among the terminals 3 and 3'.

In some aspects, image processing systems consistent with the disclosed embodiments may display image data stored in the database unit 23 to a surveillance agent who uses the second surveillance information terminal unit 3'. By way of example, when another surveillance agent finds a suspicious object and/or a suspicious person, the disclosed embodiments facilitate the sharing of corresponding matching image data among other surveillance agents. Thus, the image processing system may perform and support appropriate services.

Embodiment 7

Figure 13:
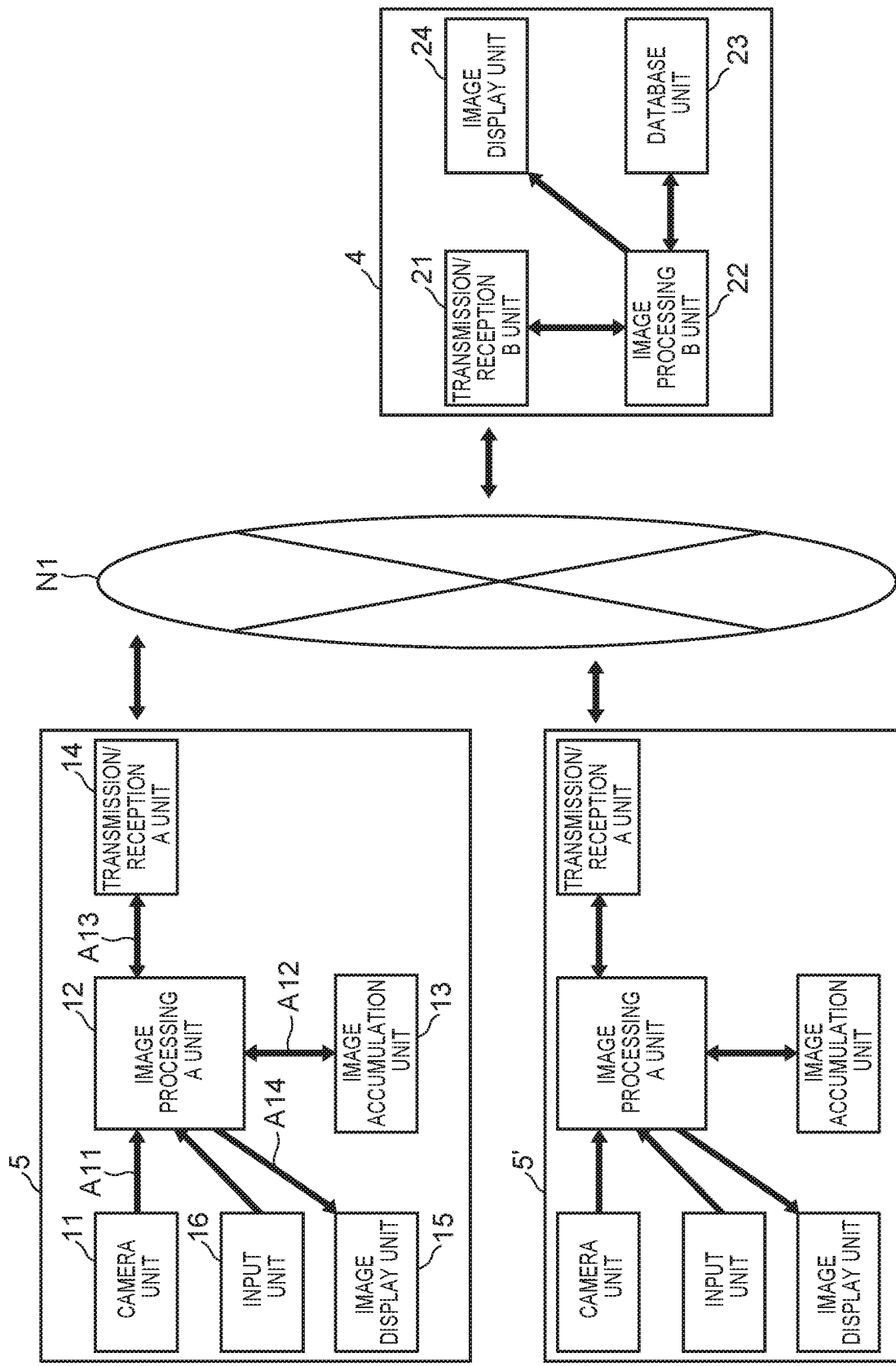
FIG. 13 illustrates an exemplary configuration of an image processing system, consistent with the disclosed embodiments.

FIG. 13 illustrates an exemplary configuration of an image processing system, in accordance with a seventh embodiment. The image processing system includes multiple third surveillance information terminal units (e.g., units 5 and 5') connected to a first surveillance server unit 2. Further, although described in terms of two third surveillance information terminal units 5 and 5', the disclosed embodiments are not limited to such exemplary numbers of terminal units, and in further embodiments, the image processing system may include any additional or alternate number of third surveillance information terminal units (e.g., three or more).

As illustrated in FIG. 13, the third surveillance information terminal units 5 and 5' and the first surveillance server unit 2 (or the second surveillance server unit 4) are connected with each other through wire or wireless communication channel C1. As for the third surveillance information terminal units 5 and 5', since the configuration and operation are described above, only parts of different operation and/or functionality are described in detail. Further, although not depicted in FIG. 13, the exemplary image processing system may also couple a second surveillance server unit 4 (e.g., as described above in reference to FIG. 5) to the third surveillance information terminal units, either alone or in conjunction with the first surveillance server unit 2.

As described above, for example, a surveillance agent who is associated with the third surveillance information terminal unit 5 may input, into the input unit 16, the object ID of an interesting object in image data subjected to object detection. In some aspects, the object ID and partial image data A13 may be input in the first surveillance server unit 2 through the network N1. In the first surveillance server unit 2, the image processing B unit 22 may be configured to perform image matching between image data or image feature for identifying the image stored within the database unit 23 and partial image data A13.

In an instance where partial image data A13 matches with the stored image data, the first surveillance server unit 2 may transmit the stored image data to the third surveillance information terminal unit 5' as matching image data.

In some aspects, the third surveillance information terminal unit 5' may present the matching image data to an operator using the image display unit 15. Using the disclosed embodiments, image data detected by another surveillance information terminal may be shared among the terminals.

In certain aspects, image processing systems consistent with the disclosed embodiments may be configured to display the image data stored in the database unit 23 for a surveillance agent that uses the third surveillance information terminal unit 5'. By way of example, when another surveillance agent finds a suspicious object and/or a suspicious person, the disclosed embodiments may share information among other surveillance agents, and the image processing system may perform and support appropriate services.

Embodiment 8

Figure 14:
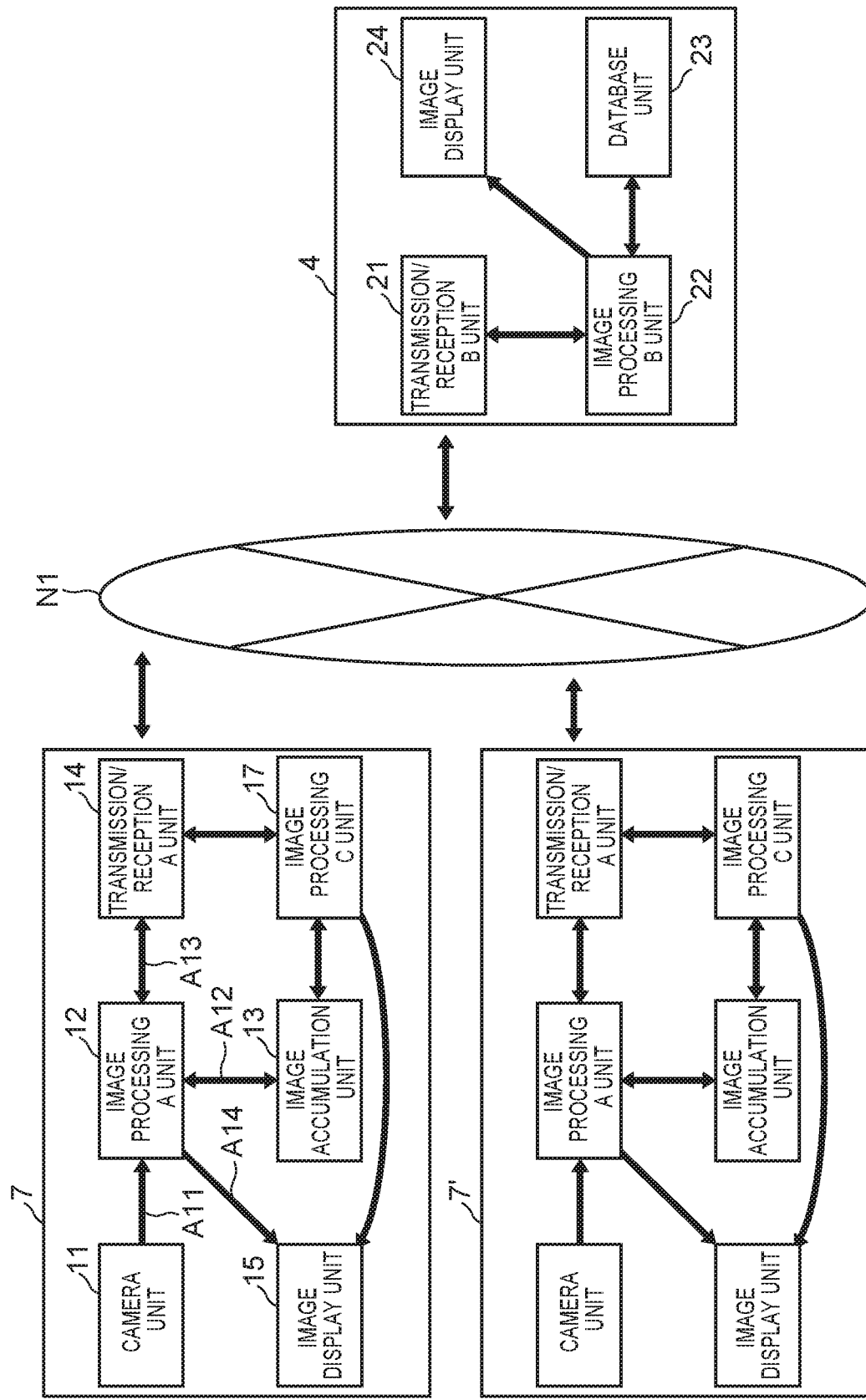
FIG. 14 illustrates an exemplary configuration of an image processing system, consistent with the disclosed embodiments.

FIG. 14 illustrates an exemplary configuration of an image processing system, in accordance with an eighth embodiment. The image processing system of FIG. 14 includes multiple fourth surveillance information terminal units (e.g., units 7 and 7') and a first surveillance server unit 2. Further, although described in terms of two fourth surveillance information terminal units 7 and 7', the disclosed embodiments are not limited to such exemplary numbers of terminal units, and in further embodiments, the image processing system may include any additional or alternate number of fourth surveillance information terminal units (e.g., three or more).

As illustrated in FIG. 14, the fourth surveillance information terminal units 7 and 7' and the first surveillance server unit 2 (or the second surveillance server unit 4) are connected with each other through wire or wireless communication channel C1. As for the fourth surveillance information terminal units 7 and 7', since the configuration and operation are described above, only parts of different operation and/or functionality are described in detail. Further, although not depicted in FIG. 14, the exemplary image processing system may also couple a second surveillance server unit 4 (e.g., as described above in reference to FIG. 5) to the fourth surveillance information terminal units, either alone or in conjunction with the first surveillance server unit 2.

In an embodiment, image data or image feature for identifying the image associated with a target object may be input from the first surveillance server unit 2 into the fourth surveillance information terminal unit 7, and the image feature is stored in the image processing C unit 17. The image processing C unit 17 may be configured to perform image matching on the basis of object image region data detected in the image processing A unit 12 and the stored image data or the stored image feature. Further, in some aspects, the fourth surveillance information terminal unit 7' may be configured to perform one or more of the exemplary processes performed by the fourth surveillance information terminal unit 7.

Partial image data A13 of an object detected by the fourth surveillance information terminal unit 7 (and additionally or alternatively, by fourth surveillance information terminal unit 7') may be transmitted to the first surveillance server unit 2 through the network N1. The first surveillance server unit 2 may transmit the image data to the fourth surveillance information terminal units 7' and 7 which are other terminals. The fourth surveillance information terminal units 7 and 7' may display matching image data received from the other terminal on the image display unit 15. By this means, image data detected by another surveillance information terminal is shared among the terminals.

The disclosed embodiments may, for example, facilitate processes that share an image of a surveillance object among surveillance information terminal units. By way of example, when another surveillance agent finds a suspicious object and a suspicious person, and so on, the disclosed embodiments may share information with terminal units associated with other surveillance agents. Thus, the image processing system may perform and support appropriate services.

Embodiment 9

Figure 15:
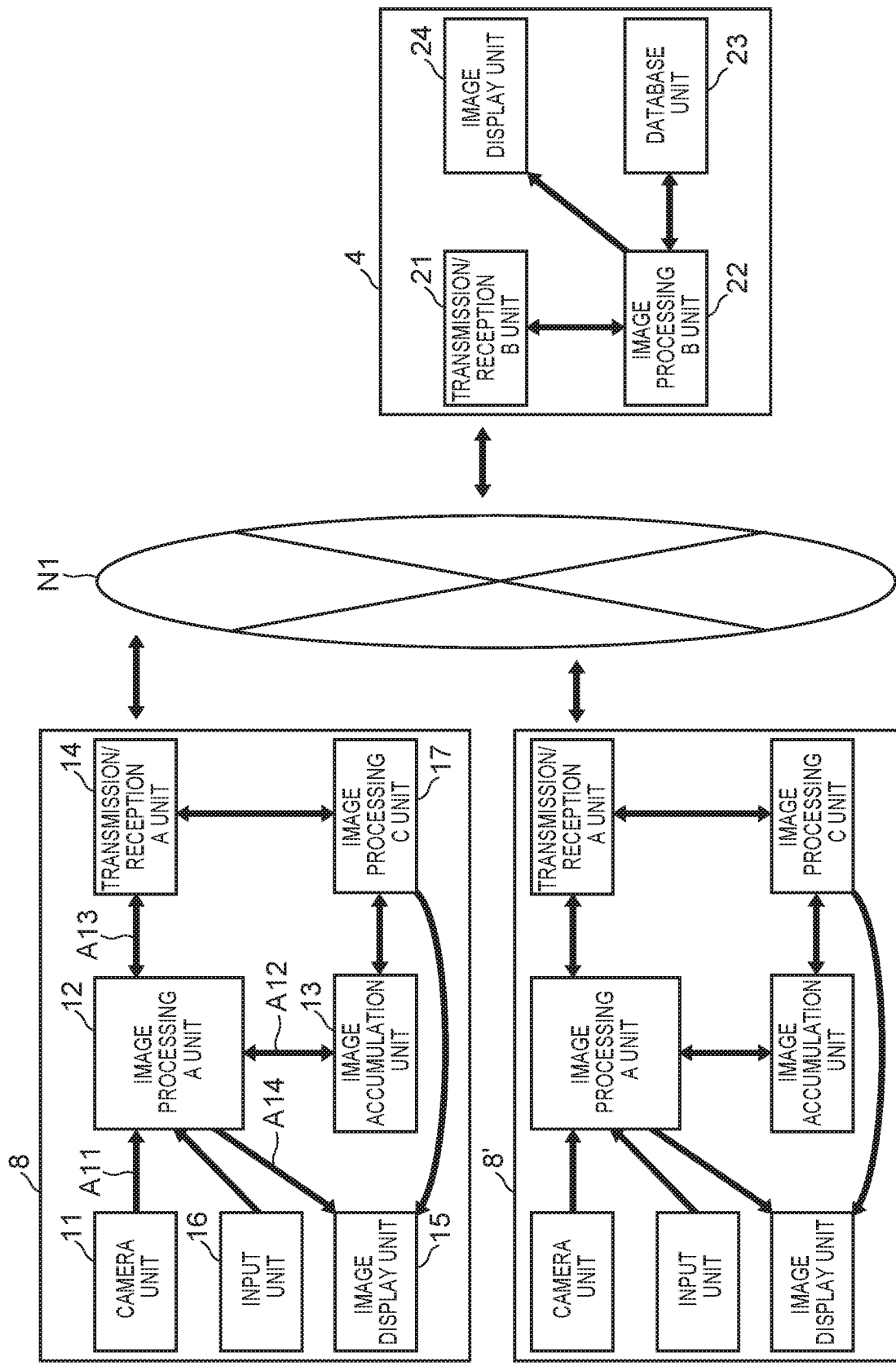
FIG. 15 illustrates an exemplary configuration of an image processing system, consistent with the disclosed embodiments.

FIG. 15 illustrates an exemplary configuration of an image processing system, in accordance with a ninth embodiment. The image processing system of FIG. 15 includes multiple fifth surveillance information terminal units (e.g., units 8 and 8') connected to a second surveillance server unit 4. Further, although descried in terms of two fifth surveillance information terminal units 8 and 8', the disclosed embodiments are not limited to such exemplary numbers of terminal units, and in further embodiments, the image processing system may include any additional or alternate number of more fifth surveillance information terminal units (e.g., three or more).

The fifth surveillance information terminal units 8 and 8' and the second surveillance server unit 4 are connected with each other through wire or wireless communication channel C1. As for the fifth surveillance information terminal units 8 and 8', since the configuration and operation are described above, and only parts of different operation and/or functionalities are described in detail. Further, although not depicted in FIG. 15, the exemplary image processing system may also couple a first surveillance server unit 2 (e.g., as described above in reference to FIG. 5) to the fifth surveillance information terminal units, either alone or in conjunction with the second surveillance server unit 4.

In an embodiment, a surveillance agent who is associated with the fifth surveillance information terminal unit 8 may input, into the input unit 16, an ID of an object which the surveillance agent wants to monitor. The fifth surveillance information terminal unit 8 may transmit the ID to the second server unit 4. The second surveillance server unit 4 may match whether an image of an object identified by the transmitted ID is image data stored in the database unit 23.

In certain aspects, when an image data of the object identified by the transmitted ID is not included within stored image data (e.g., within the database unit 23), the image data of the object identified by the transmitted ID is transmitted to the fifth surveillance information terminal unit 8' as matching image data. The fifth surveillance information terminal unit 8' may be configured to present the matching image data on the image display unit 15.

In a case where a target object to be detected is specified in advance, the second surveillance server unit 4 may transmits image data or image feature for identifying the image to the fifth surveillance information terminal units 8 and/or 8'. In certain aspects, the first surveillance server unit 2 may transmit the image data or the image feature to the fifth surveillance information terminal units 8 and/or 8' upon detection of the target object or at a time proximate to the detection of the target object. Further, upon receipt of the image feature by fifth surveillance information terminal units 8 and/or 8', and the feature amount may be stored in the image processing C unit 17.

In some aspects, the image processing C unit 17 may compare the matching image data with the image data or the image feature of the target object, and, in a case where they are matched, displays the matching image data on the image display unit 15.

The disclosed embodiments may, for example, facilitate processes that share an image of a surveillance object among surveillance information terminal units. By way of example, when another surveillance agent finds a suspicious object and/or a suspicious person, the disclosed embodiments may share information with terminal units associated with other surveillance agents. Thus, the image processing system may perform and support appropriate services.

Embodiment 10

Figure 17:
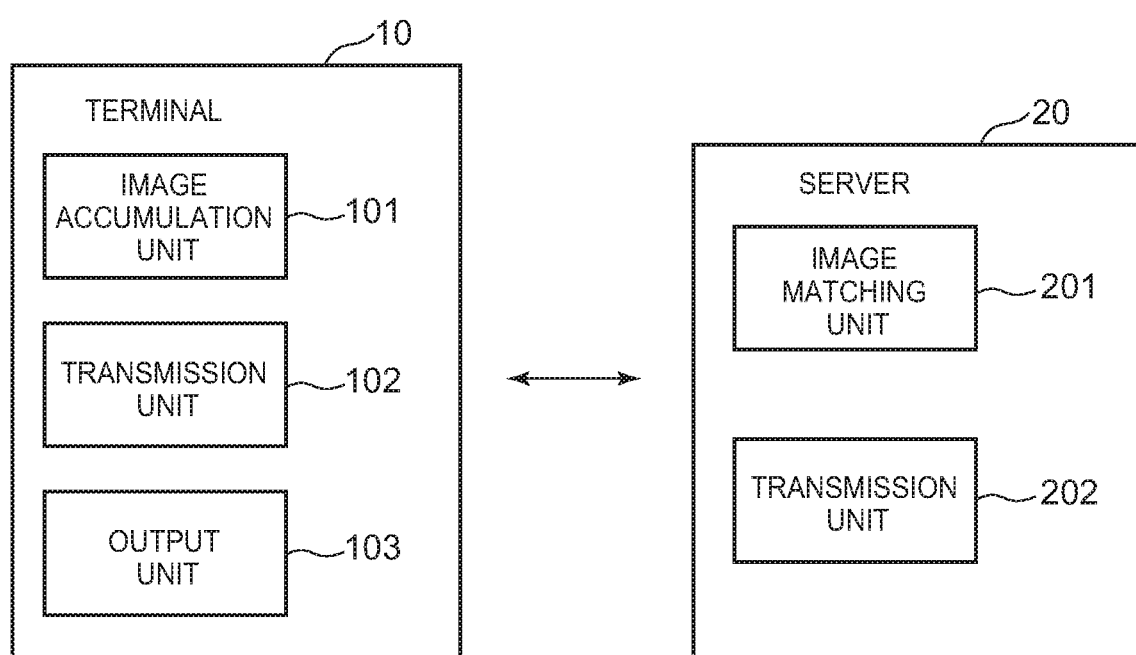
FIG. 17 illustrates an exemplary configuration of an image processing system, consistent with the disclosed embodiments.

FIG. 17 illustrates an exemplary configuration of an image processing system, in accordance with a tenth embodiment. The image processing system of FIG. 17 includes a terminal unit 10, which may include an image accumulation unit 101, a transmission unit 102 and an output unit 103, and a server unit 20, which may include an image matching unit 201 and a transmission unit 202.

In one aspect, the image accumulation unit 101 stores an image and an ID (identification information) of the image, or a partial image that includes a portion of that image, in association with each other. The image may be acquired from an imaging device, such as a camera. The terminal 10 may assign a unique ID to each acquired image (and additionally or alternatively, each partial image) and record the each acquired image (and additionally or alternatively, each partial image) in the image accumulation unit 101. In other aspects, the terminal 10 may acquire an image associated with a previously assigned ID, and may record the image in the image accumulation unit 101.

By way of example, a partial image may refer to a partial image "cut out" or extracted from an image. The partial image includes, for example, a region in which an object appears (e.g., an object region). As described above, the terminal 10 may include an image processing unit capable of performing object detection functionality. Further, in some instances, the ID assigned to an image may correspond to a frame number of the image. In instances where multiple objects are included on a screen, the ID may be assigned to every partial image may include object position information (e.g., coordinate information), the object size, etc. The transmission unit 102 may transmit the ID and the partial image to the server 20.

In an embodiment, the output unit 103 outputs additional information based on the ID received from the server 20. The output may, for example, include an image display output to a display unit and/or an output to an external device. The additional information may include information identifying a result of a matching process performed by the server 20. For example, the additional information may include information to distinguish an image (or partial image) associated with the ID received from the server 20 from another image (or another partial image). For example, when an object corresponds to a person's face, the additional information may identify a frame superimposed and displayed on the detected face region, as depicted in FIG. 8. As illustrated in FIG. 8, the ID to identify the person may be superimposed and displayed near the frame of the face region. In some aspects, the ID may itself represent additional information, e.g., a partial image in which the face region appears.

The image matching unit 201 may match a partial image receive from the terminal 10 with a candidate image. In some instances, the candidate image may be stored in a database disposed within the server 20 or at a network location accessible to the server 20. The transmission unit 202 may transmit the ID corresponding to the matched image to the terminal 10.

Figure 18:
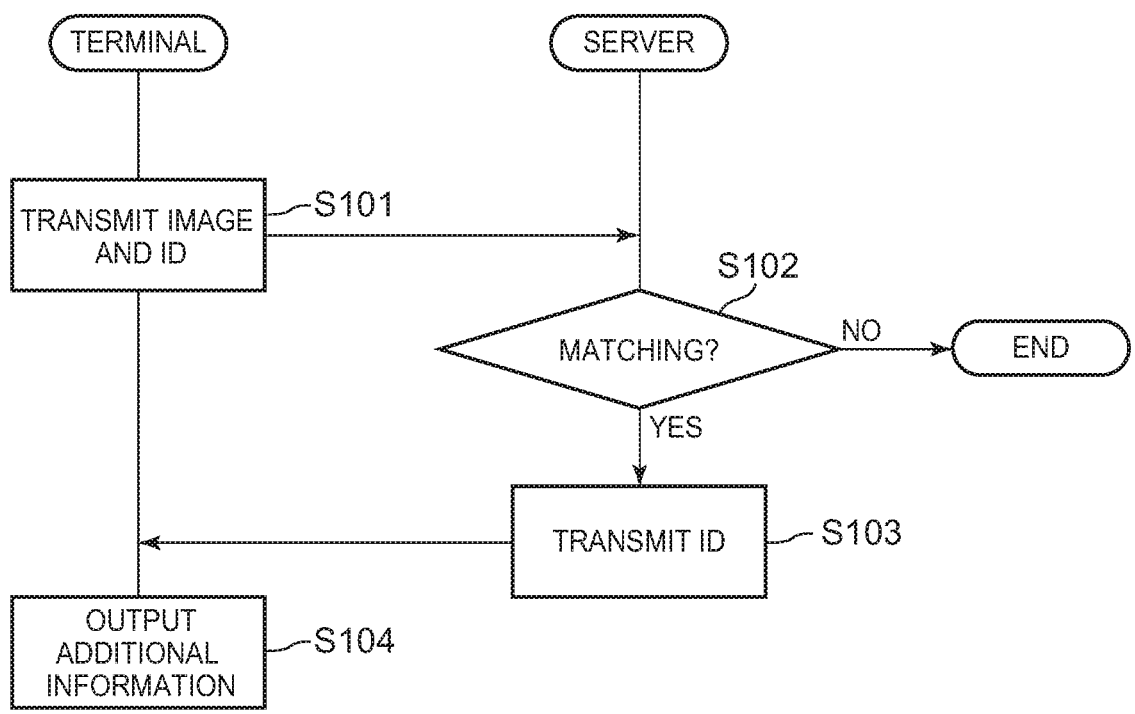
FIG. 18 illustrates depicts a flowchart of an exemplary process, consistent with the disclosed embodiments.

FIG. 18 illustrates an exemplary process performed by the image processing system in accordance with the disclosed embodiments. As described above, the transmission unit 102 of the terminal 10 may transmit the ID and a partial image to the server 20 (e.g., step S101 of FIG. 18). The image matching unit 201 of the server 20 may, in some aspects, match the partial image received from the terminal 10 with a candidate image (e.g., step S102 of FIG. 18). If the image matching unit 20 were to determine that the partial image matches the candidate image (e.g., step S102; Yes), the ID corresponding to the matched image may be transmitted to the terminal 10 (e.g., step S103 of FIG. 18). The output unit 103 of the terminal 10 may output additional information based on the ID received from the server 20 (e.g., step S104 of FIG. 18). Since the terminal 10 accumulates the whole image, it is possible to understand the relationship between the matching result of the partial image and the whole image including the partial image. Therefore, for example, the output unit 103 may superimpose and display a partial image (e.g., a face image) and the whole image (such as the entire character image and a background image) on a display unit, as illustrated in FIG. 8.

In some aspects, since an image which a terminal transmits to a server may be a partial image, the image processing system can reduce a communication load between the servers and terminals. Further, in additional embodiments, the image matching unit does not have to be installed in the terminal, and a terminal holder (e.g., an operator and/or a surveillance agent) may confirm a result of causing image matching to be performed in the server. Therefore, image processing systems consistent with the disclosed embodiments may perform and support surveillance services, customer services, and other services.

Embodiment 11

Figure 19:
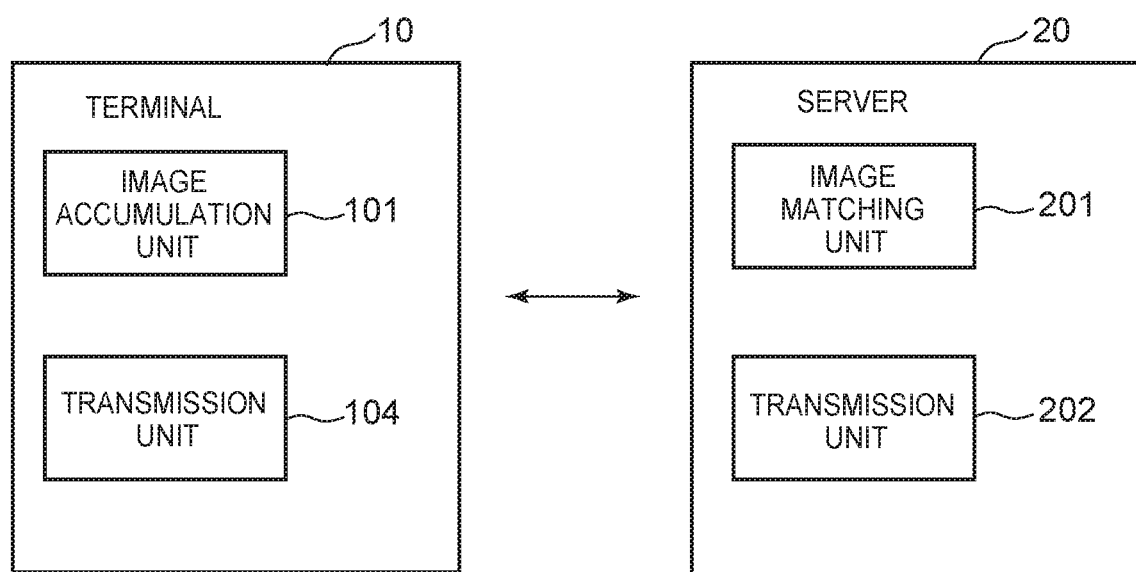
FIG. 19 illustrates an exemplary configuration of an image processing system, consistent with the disclosed embodiments.

FIG. 19 illustrates an exemplary configuration of an image processing system, in accordance with an eleventh embodiment. The image processing system of FIG. 19 may include a terminal 10, which includes an image accumulation unit 101 and a transmission unit 104, and a server 20, which includes an image matching unit 201 and a transmission unit 202. The operation and functionality of image accumulation unit 101, the image matching unit 201 and the transmission unit 202 are comparable to similarly numbered units described above, and additional explanation is omitted. As described above, the server 20 may transmit the matched image, the image ID indicates the matched image, and/or the additional information to the terminal 10. Further, when a partial image is transmitted to the server 20 and the server 20 performs the image matching, a surveillance agent or similar individual associated with the server 20 may desire to watch and/or monitor the circumstance indicated by not only the partial image, but also the whole image of an image including the partial image. In some aspects, the transmission unit 104 may function in a manner similar to the transmission unit 102 described above. For instance, the transmission unit 104 may initially transmit a partial image to the server 20, and, afterward, transmit to the server 20 the whole image including a partial image identified by the ID received from the server 20.

Figure 20:
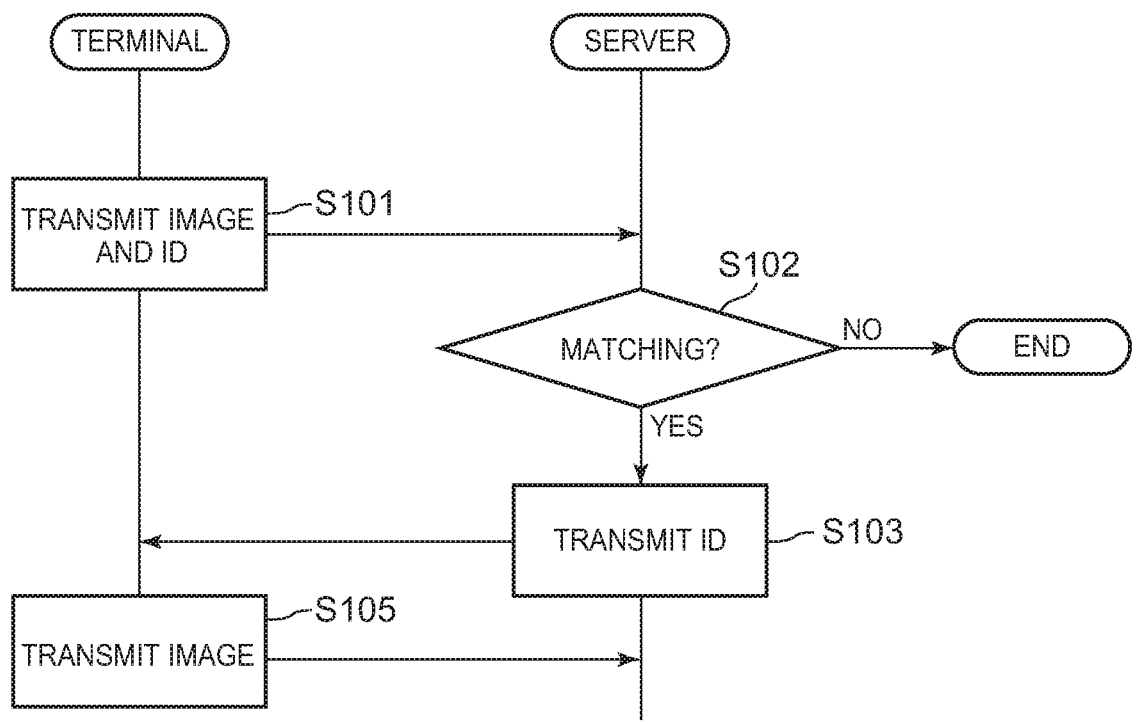
FIG. 20 illustrates depicts a flowchart of an exemplary process, consistent with the disclosed embodiments.

FIG. 20 illustrates an exemplary process performed by the image processing system, in accordance with the disclosed embodiments.

As described above, the transmission unit 102 of the terminal 10 may transmit the ID and a partial image to the server 20 (e.g., step S101 of FIG. 20). The image matching unit 201 of the server 20 may, in some aspects, match the partial image received from the terminal 10 with a candidate image (e.g., step S102 of FIG. 20). If the image matching unit 20 were to determine that the partial image matches the candidate image (e.g., step S102; Yes), the ID corresponding to the matched image may be transmitted to the terminal 10 (e.g., step S103 of FIG. 20). The transmission unit 104 may initially transmit a partial image to the server 20, and, afterward, transmit to the server 20 the whole image including a partial image identified by the ID received from the server 20 (e.g., step S105 of FIG. 20).

In some aspects, when the server 20 matches the partial image with a candidate image, the server 20 may make a transmission request of the whole image including the partial image to the terminal 10.

Embodiment 12

Figure 21:
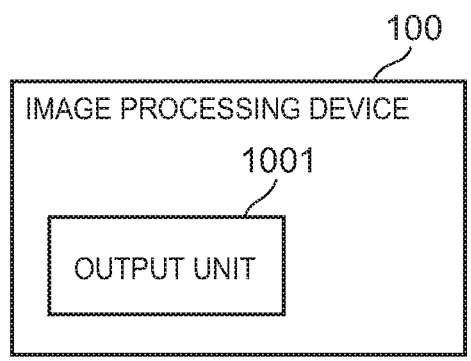
FIG. 21 illustrates an exemplary configuration of a terminal, consistent with the disclosed embodiments.

FIG. 21 illustrates an exemplary image processing device 100, in accordance with a twelfth embodiment.

In one aspect, an output unit 1001 of the image processing device 100 may be configured to: (i) output an image of an object region when a value indicative of a size of the object region in an image captured by an imaging unit is greater than a threshold value; and (ii) output an image of a predetermined region including the object region when the value is not greater than the threshold value. The output may, for example, represent an image display output provided, by the output unit 1001, to a display unit, an external device, or of device or unit capable of presenting visual representations of data.

In an embodiment, the image processing device 100 may include an imaging unit (e.g., a camera), and a person may utilize the image processing device 100 capture an image of an environment surrounding the imaging unit. The image processing device 100 may also include an object detection unit, which may be configured to detect a region of an object from the image captured by the imaging unit. By way of example, the object may include, but is not limited to, a person, a car, a commodity, any portion thereof, and letters presented in the surface of them and a seal fixed to them. Here, it is presumed that the object is a person's face.

Thus, in some aspects, the size of the face image detected by the object detection unit may correspond to a size required for matching with a wanted person's photograph, and so on. In other aspects, the size of a detected face image may exceed a predetermined threshold value. For example, as illustrated in FIG. 16, in an instance where a first person's face inter-eye distance W1 that is a value indicating the object region size is greater than pixel number TH1 that is a threshold, the object detection unit cuts out a face image (1).

In other aspects, illustrated in FIG. 16, in an instance where a second person's face inter-eye distance W2 is less than pixel number TH1, the object detection unit cuts out an image data region of the outline size of the entire person's body of the second person which is a predetermined region including the face image.

In some embodiments, although the facial size of the first person may be greater than predefined pixel number TH1 and less than TH2, a possibility exists that the object detection unit may be unable to acquire the first person's facial features (e.g., because the first person wears glasses or a mask). In certain aspects, the object detection unit may cut out an image data region larger in size than the region (1) outlined by the first person's face (e.g., a region outlining the entire body of the first person).

As another example, the object for surveillance within the image data (e.g., a surveillance object) may correspond to a wanted vehicle. In an instance, when the object detection unit determines that a width W3 of the detected license plate is greater than predefined pixel number TH1, the object detection unit cuts out the region of the license plate as an image data region (3). Alternatively, in an instance where the object detection unit determines that a width W4 of a license plate is less than predefined pixel number TH1, the object detection unit cuts out an image data region (4) of the entire car outline or a size larger than the entire car outline. The output unit 1001 outputs the image cut out in this way.

Figure 22:
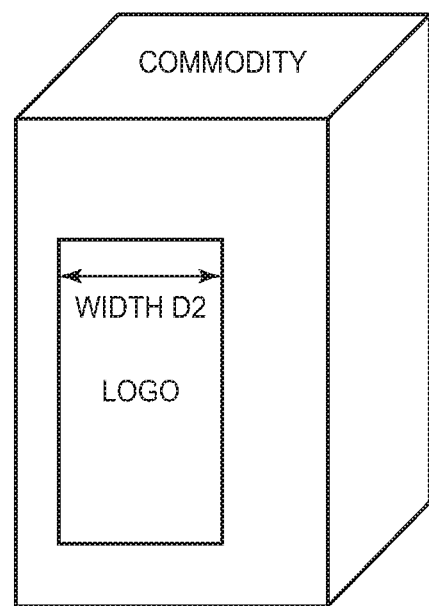
FIG. 22 illustrates depicts a flowchart of an exemplary an image cutout method, consistent with the disclosed embodiments.

As another example, depicted in FIG. 22, the object may include a logo of a commodity. The logo may correspond to a brand, a trademark, a sign, a character, and/or a figure that can distinguish the commodity from other commodities. As depicted in FIG. 22, when a width D2 of the detected logo is greater than a predefined pixel number, the object detection unit may be configured to cut out or extract a region of the logo as an image data region. Alternatively, when a width D2 of the logo is less than a predefined pixel number, the object detection unit may be configured to cut out or extract an image data region of the entire commodity outline, or a size larger than the entire commodity outline. The output unit 1001 outputs the image cut out to a display unit and/or an external device.

In certain aspects, image processing systems consistent with the disclosed embodiments may prevent an output of a useless image region. Therefore, the image processing system can perform image processing in a more efficient manner, and the image processing system may provide and support appropriate services.

Additional Exemplary Embodiments

In one embodiment, an image processing system includes a terminal. The terminal may, in some instances, include an image accumulation unit that stores an image and identification information on the image or a partial image of the image. The terminal may also include transmission unit that transmits the identification information and the partial image to a server, and an output unit that outputs additional information based on identification information received from the server. Further, the image processing system may include server having an image matching unit that matches the partial image received from the terminal with an accumulated candidate image, and a transmission unit that transmits the identification information corresponding to said partial image to the terminal.

In another embodiment, the above-mentioned output unit in the image processing system may be an image display unit that displays an image. The output unit may, in some instances, superimpose and display information on a matching result on the image as the additional information.

In another embodiment, an image processing system includes a terminal. The terminal may, in some instances, include an image accumulation unit that stores an image and identification information on the image or a partial image of the image. The terminal may also include a transmission unit that transmits the identification information of the image and the partial image of the image to a server and transmits the image identified by identification information received from the server to the server. Further, the image processing system may include server having an image matching unit that matches the partial image received from the terminal with an accumulated candidate image, and a transmission unit that transmits the identification information corresponding to said partial image to the terminal.

In some aspects, the above-mentioned partial image may include an object detected from an image, and the above-mentioned identification information may be position information of the object or time information on acquisition of the image.

In some aspects, the terminal of the above-mentioned image processing system may include an input unit that designates a region of the detected object. The image processing system may store a partial image in a database if the partial image including the object region is not matched with the candidate image.

In some aspects, the above-mentioned terminal may include an input unit that designates a region of the detected object. Further, a partial image including the object region designated by the input unit may be matched with the candidate image more preferentially than other partial images.

In some aspects, the transmission unit of the above-mentioned server may transmit an image designated from the candidate image to the above-mentioned terminal, and the above-mentioned terminal may include an image processing unit that matches the image and the partial image when the designated image is received.

In some aspects, when a plurality of the above-mentioned terminals exist and the partial image transmitted from at least one of the terminals to the above-mentioned server is matched in the image matching unit, the server may transmit the identification information corresponding to said partial image to a different terminal from the terminal.

In another embodiment, an image processing device may include an output unit that outputs an object region when a value indicating a size of the object region of an image taken by an imaging unit is greater than a threshold, and, otherwise, outputs an image of a predetermined region including the object region.

In some aspects, the object region may be a face region of a person and the predetermined region may be an image including a whole of the person.

In some aspects, the object region may be a license plate of a car and the predetermined region may be an image including a whole of the car.

In another embodiment, an image processing method may include storing an image and identification information on the image or a partial image of the image in a terminal, transmitting from the terminal the identification information and the partial image to a server and outputting additional information based on identification information received from the server.

The image processing method may further include matching by the server the partial image received from the terminal with an accumulated candidate image and transmits the identification information corresponding to the matched image to the terminal.

In some aspects, the image processing method may further include outputting by the terminal the additional information to an image display unit that displays an image, and superimposing and displaying by the terminal information on a matching result on the image as the additional information.

In another embodiment, an image processing method may include storing an image and identification information on the image or a partial image of the image in a terminal, transmitting from the terminal the identification information of the image and the partial image of the image to a server and transmitting from the terminal to the server the image identified by identification information received from the server, and matching by the server the partial image received from the terminal with an accumulated candidate image and transmits the identification information corresponding to the matched image to the terminal.

In some aspects, the partial image may include an object detected from an image, and the identification information may be position information of the object or time information on acquisition of the image.

In some aspects, the image processing method may further include accepting by the terminal the designation of an object region through an input unit that designates a region of the detected object, and, when a partial image including the designated object region is not matched with the candidate image, storing the partial image in a database in the terminal.

In some aspects, the above-mentioned terminal may accept the designation of an object region through an input unit that designates a region of the detected object. Further, a partial image including the designated object region may be matched with the candidate image more preferentially than other partial images.

In some aspects, the image processing method may further include transmitting by the server an image designated from the candidate image to the terminal, and when the designated image is received, matching by the terminal the image and the partial image.

In some aspects, the image processing method may further include, when a plurality of the terminals exist and the partial image transmitted from at least one of the terminals to the server is matched, transmitting by the server the identification information corresponding to the matched image to a different terminal from the terminal.

In another embodiment, an image processing method may include outputting an object region when a value indicating a size of the object region of an image taken by an imaging unit is greater than a threshold, and, otherwise, outputting an image of a predetermined region including the object region.

In some aspects, the object region may be a face region of a person and the predetermined region may be an image including a whole of the person.

In some aspects, the object region may be a license plate of a car and the predetermined region may be an image including a whole of the car.

In another embodiment, an image processing program may cause a computer to execute the above-mentioned image processing method.

What is claimed is:

1. A collation system comprising:
   a server; and
   at least one terminal communicable with the server via a communication network,
   wherein
   the at least one terminal comprises at least one processor configured to:
   capture a first image including a person;
   detect a face in the first image; and
   transmit a second image including the face, to the server via the communication network without transmitting the first image, wherein the second image is a partial region of the first image; and
   the server is configured to:
   receive the second image from the at least one terminal via the communication network;
   perform matching operation between the received second image and a registered data stored in a database; and
   store the received second image in the database;
   wherein:
   the at least one terminal comprises a first terminal;
   the server is further configured to transmit the received second image to a second terminal; and
   the second terminal is different from the first terminal and configured to display the received second image.

2. The collation system according to claim 1, wherein the at least one processor is configured to extract, as the partial region, only a facial area required for recognition from the first image.

3. The collation system according to claim 2, wherein the server is further configured to display the received second image and information indicating a result of the matching operation.

4. The collation system according to claim 2, wherein the face is a first face and the at least one processor is further configured to:
   detect a second face in the first image; and
   transmit a third image including the second face to the server.

5. The collation system according to claim 1, wherein the at least one processor is configured to determine which range of the first image shall be determined to be the partial region, based on adequacy of facial feature in a facial region of the person.

6. The collation system according to claim 1, wherein the at least one processor is further configured to:
   assign, when two or more persons exist in the first image, partial image identifiers to two or more second images, respectively, wherein the two or more second images are partial regions of the first image, the partial regions being determined based on facial regions of the two or more persons, respectively; and
   transmit the partial image identifiers with the two or more second images to the server.

7. The collation system according to claim 1, wherein the server is further configured to output, when the face of the person in the second image matches a face of a registered person registered in the database, an identifier of the registered person and time information indicating when the second image was captured.

8. The collation system according to claim 1, wherein:
   the at least one processor is further configured to transmit the second image and time information indicating when the second image was captured, to the server via the communication network; and
   the server is further configured to receive the second image and the time information via the communication network.

9. A terminal comprising:
   at least one memory storing instructions; and
   at least one processor coupled to the at least one memory and configured to execute the instructions to:
   capture a first image including a person;

detect a face in the first image; and
transmit a second image including the face, to the server via a communication network without transmitting the first image, wherein;
the second image is a partial region of the first image; and
the server is configured to:
receive the second image from the at least one terminal via the communication network;
perform matching operation between the received second image and a registered data stored in a database; and
store the received second image in the database;
wherein:
the at least one terminal comprises a first terminal;
the server is further configured to transmit the received second image to a second terminal; and
the second terminal is different from the first terminal and configured to display the received second image.

10. The terminal according to claim 9, wherein the at least one processor is configured to extract, as the partial region, only a facial area required for recognition from the first image.

11. The terminal according to claim 10, wherein the face is a first face and the at least one processor is further configured to execute the instructions to:
detect a second face in the first image; and
transmit a third image including the second face to the server.

12. The terminal according to claim 1, wherein the at least one processor is configured to determine which range of the first image shall be determined to be the partial region, based on adequacy of facial feature in a facial region of the person.

13. The terminal according to claim 1, wherein the at least one processor is further configured to:
assign, when two or more persons exist in the first image, partial image identifiers to two or more second images, respectively, wherein the two or more second images are partial regions of the first image, the partial regions being determined based on facial regions of the two or more persons, respectively; and
transmit the partial image identifiers with the two or more second images to the server.

14. An image processing method comprising:
capturing a first image including a person;
detecting a face in the first image; and
transmitting a second image including the face, to the server via a communication network without transmitting the first image,
wherein:
the second image is a partial region of the first image; and
the server is configured to:
receive the second image from at least one terminal via the communication network;
perform matching operation between the received second image and a registered data stored in a database; and
store the received second image in the database;
wherein:
the at least one terminal comprises a first terminal;
the server is further configured to transmit the received second image to a second terminal; and
the second terminal is different from the first terminal and configured to display the received second image.

15. The image processing method according to claim 14, comprising extracting, as the partial region, only a facial area required for recognition from the first image.

16. The image processing method according to claim 15, wherein the face is a first face and the image processing method further comprises:
detecting a second face in the first image; and
transmitting a third image including the second face to the server.

17. The image processing method according to claim 14, comprising determining which range of the first image shall be determined to be the partial region, based on adequacy of facial feature in a facial region of the person.

18. The image processing method according to claim 14, further comprising:
assigning, when two or more persons exist in the first image, partial image identifiers to two or more second images, respectively, wherein the two or more second images are partial regions of the first image, the partial regions being determined based on facial regions of the two or more persons, respectively; and
transmitting the partial image identifiers with the two or more second images to the server.

19. A non-transitory computer-readable storage medium storing a program that causes a computer to perform:
capturing a first image including a person;
detecting a face in the first image; and
transmitting a second image including the face, to the server via a communication network without transmitting the first image,
wherein:
the second image is a partial region of the first image; and
the server is configured to:
receive the second image from at least one terminal via the communication network;
perform matching operation between the received second image and a registered data stored in a database; and
store the received second image in the database;
wherein:
the at least one terminal comprises a first terminal;
the server is further configured to transmit the received second image to a second terminal; and
the second terminal is different from the first terminal and configured to display the received second image.

20. The storage medium according to claim 19, wherein the program causes the computer to perform extracting, as the partial region, only a facial area required for recognition from the first image.

21. The storage medium according to claim 20, wherein the program further causes the computer to perform:
detecting a second face in the first image; and
transmitting a third image including the second face to the server.

22. The storage medium according to claim 19, wherein the program causes the computer to perform determining which range of the first image shall be determined to be the partial region, based on adequacy of facial feature in a facial region of the person.

23. The storage medium according to claim 19, wherein the program further causes the computer to perform:
assigning, when two or more persons exist in the first image, partial image identifiers to two or more second images, respectively, wherein the two or more second images are partial regions of the first image, the partial regions being determined based on facial regions of the two or more persons, respectively; and transmitting the partial image identifiers with the two or more second images to the server.

24. A terminal comprising:

at least one memory storing instructions; and at least one processor coupled to the at least one memory and configured to execute the instructions to:

capture a first image including a person;

detect a face in the first image; and transmit a second image including the face, to the server via a communication network without transmitting the first image, wherein:

the second image is a partial region of the first image; and the server is configured to:

receive the second image from the at least one terminal via the communication network;

assign, to the received second image, time information indicating when the second image was received;

perform matching operation between the received second image and a registered data stored in a database; and store the received second image in the database;

wherein:

the at least one terminal comprises a first terminal;

the server is further configured to transmit the received second image to a second terminal; and the second terminal is different from the first terminal and configured to display the received second image.

25. The terminal according to claim 24 wherein the at least one processor is configured to extract, as the partial region, only a facial area required for recognition from the first image.

26. The terminal according to claim 24, wherein the at least one processor is configured to determine which range of the first image shall be determined to be the partial region, based on adequacy of facial feature in a facial region of the person.

* * * * *